US012175642B2

(12) United States Patent
Kanazawa et al.

(10) Patent No.: US 12,175,642 B2
(45) Date of Patent: Dec. 24, 2024

(54) HIGH RESOLUTION INPAINTING WITH A MACHINE-LEARNED AUGMENTATION MODEL AND TEXTURE TRANSFER

(71) Applicant: Google LLC, Mountain View, CA (US)

(72) Inventors: Noritsugu Kanazawa, Campbell, CA (US); Neal Wadhwa, Cambridge, MA (US); Yael Pritch Knaan, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 358 days.

(21) Appl. No.: 17/726,720

(22) Filed: Apr. 22, 2022

(65) Prior Publication Data
US 2023/0342890 A1   Oct. 26, 2023

(51) Int. Cl.
*G06T 5/77*   (2024.01)
*G06T 7/11*   (2017.01)
*G06T 11/20*  (2006.01)

(52) U.S. Cl.
CPC .......... *G06T 5/77* (2024.01); *G06T 7/11* (2017.01); *G06T 11/20* (2013.01); *G06T 2207/10016* (2013.01); *G06T 2207/20016* (2013.01); *G06T 2210/12* (2013.01)

(58) Field of Classification Search
CPC ........... G06T 11/20; G06T 2207/10016; G06T 2207/20016; G06T 2210/12; G06T 5/77; G06T 7/11
See application file for complete search history.

(56) References Cited

U.S. PATENT DOCUMENTS

2024/0144549 A1* 5/2024 Garces ................. G06T 7/0002

OTHER PUBLICATIONS

Suvorov et al., "Resolution-robust Large Mask Inpainting with Fourier Convolutions", arXiv:2109.07161, https://doi.org/10.48550/arXiv.2109.07161, 11 pages.
Yi et al., "Contextual Residual Aggregation for Ultra High-Resolution Image Inpainting", arXiv:2005.09704, https://doi.org/10.48550/arXiv.2005.09704, 22 pages.

* cited by examiner

*Primary Examiner* — Manuchehr Rahmjoo
(74) *Attorney, Agent, or Firm* — DORITY & MANNING P.A.

(57) ABSTRACT

Systems and methods for augmenting images can utilize one or more image augmentation models and one or more texture transfer blocks. The image augmentation model can process input images and one or more segmentation masks to generate first output data. The first output data and the one or more segmentation masks can be processed with the texture transfer block to generate an augmented image. The input image can depict a scene with one or more occlusions, and the augmented image can depict the scene with the one or more occlusions replaced with predicted pixel data.

20 Claims, 13 Drawing Sheets

HIGH RESOLUTION INPAINTING WITH A MACHINE-LEARNED AUGMENTATION MODEL AND TEXTURE TRANSFER

FIELD

The present disclosure relates generally to image augmentation with an inpainting model. More particularly, the present disclosure relates to augmenting one or more images with an image augmentation model and a texture transfer block.

BACKGROUND

Images (e.g., photographs) and other forms of data often include unwanted data. As one example, the unwanted data could correspond to artifacts arising from processing an image to reduce noise in the image. As another example the unwanted data could correspond to a human person in the foreground of a landscape or an unknown person in the background of a family photo. As another example, the unwanted data could correspond to an unsightly object in an otherwise pristine background.

Thus, unwanted data can correspond to objects which occlude or obscure other portions of an image, such as a depicted scene. However, replacing the unwanted data with replacement data (e.g., replacement image data that depicts the occluded portion of the image that is occluded by the unwanted data, a process also known as "inpainting") is a challenging problem which is non-deterministic in nature. Stated differently, multiple possible solutions could be determined from the same image, resulting in a difficult problem.

SUMMARY

Aspects and advantages of embodiments of the present disclosure will be set forth in part in the following description, or can be learned from the description, or can be learned through practice of the embodiments.

One example aspect of the present disclosure is directed to a computing system for image augmentation. The system can include one or more processors and one or more non-transitory computer-readable media that collectively store instructions that, when executed by the one or more processors, cause the computing system to perform operations. The operations can include obtaining an input image and one or more input masks. The input image can depict one or more objects in a scene. The one or more input masks can identify masked pixels that correspond to the one or more objects. The operations can include processing the input image and the one or more input masks with an image augmentation model to generate an intermediate image. In some implementations, the intermediate image can depict the scene with the masked pixels replaced by predicted pixels. The operations can include processing the input image and the intermediate image with a texture transfer block to generate a refined augmented image. The texture transfer block can augment the masked pixels based on surrounding pixels in the intermediate image. The operations can include providing the refined augmented image as an output.

In some implementations, processing the input image and the intermediate image with the texture transfer block to generate the refined augmented image can include generating an image pyramid based on the input image and the one or more input masks. The image pyramid can include the input image and a plurality of downsampled versions of the input image. Processing the input image and the intermediate image with the texture transfer block to generate the refined augmented image can include processing a first downsampled image in the image pyramid to generate a first output. The first output can include first shift data, and the first shift data can be descriptive a set of first vectors associated with the copying and placing of pixels for replacing occlusion pixels. In some implementations, processing the input image and the intermediate image with the texture transfer block to generate the refined augmented image can include generating upsampled first shift data based at least in part on the first shift data and a resolution difference between the first downsampled image and a second downsampled image. The first downsampled image can be of lower resolution than the second downsampled image. Processing the input image and the intermediate image with the texture transfer block to generate the refined augmented image can include processing the upsampled first shift data and the second downsampled image in the image pyramid to generate a second output. The second output can include second shift data, and the second shift data can be determined based at least in part on the upsampled first shift data and the intermediate image. In some implementations, processing the input image and the intermediate image with the texture transfer block to generate the refined augmented image can include generating the refined augmented image based at least in part on the input image and upsampled second shift data. In some implementations, generating the image pyramid can include processing the input image and the one or more input masks to generate the second downsampled image and processing the second downsampled image to generate the first downsampled image. The second downsampled image can be generated by weighting pixels of the input image to reduce the resolution by half.

In some implementations, obtaining the input image and the one or more input masks can include: obtaining the input image, processing the input image with an image segmentation model to generate the one or more segmentation masks associated with the one or more objects in the scene, providing input image for display with one or more annotations, receiving one or more selections associated with the one or more annotations, and determining the one or more input masks based on the one or more selections. The one or more annotations can be associated with the one or more segmentations masks. In some implementations, the one or more annotations can include one or more highlighted portions of the scene, and the one or more highlighted portions can be associated with the one or more objects.

In some implementations, processing the input image and the intermediate image with a texture transfer block can include performing a texture transfer algorithm on masked pixels of the input image using the predicted pixels of the intermediate image as a target. The one or more input masks can include a subject mask and one or more occlusion masks, the subject mask can be associated with a foreground object in the scene, and the one or more occlusion masks can be associated with one or more occlusions in the input image.

In some implementations, processing the input image and the intermediate image with the texture transfer block to generate the refined augmented image can include generating a lower resolution version of the intermediate image, determining a first pixel in the intermediate image to replace, determining a second pixel in the lower resolution version that is associated with the first pixel in the intermediate image, determine one or more third pixels are adjacent to the second pixels, and generating the refined augmented image based at least in part on the one or more third pixels. The texture transfer block can be configured to determine one or more replacement pixels based on a proximity to one or more occlusion pixels, the one or more replacement pixels can be within a threshold proximity to the one or more occlusion pixels, and the one or more occlusion pixels can be associated with the one or more objects. In some implementations, the operations can be executed by a mobile computing device.

Another example aspect of the present disclosure is directed to a computer-implemented method for image augmentation. The method can include obtaining, by a computing system including one or more processors, an input image and one or more input masks. The input image can be descriptive of a foreground subject in a scene. The method can include processing, by the computing system, the input image and the one or more input masks with an image augmentation model to generate a plurality of augmented frames. In some implementations, each frame of the plurality of augmented frames can be descriptive of the foreground subject with a second perspective of the scene. The method can include processing, by the computing system, the plurality of augmented frames with a texture transfer block to generate animated image data. The texture transfer block can augment one or more pixels of each frame of the plurality of augmented frames based on surrounding pixels in the respective frame. The method can include providing, by the computing system, the animated image data as an output.

In some implementations, the method can include obtaining, by the computing system, the input image from a photo gallery. The photo gallery can include a plurality of user images. The method can include processing, by the computing system, the input image with a detection model to generate detection data. In some implementations, detection data can include data descriptive of a location for the foreground subject. The method can include generating, by the computing system, the one or more input masks based on the detection data. In some implementations, the detection data can include a plurality of bounding boxes associated with a plurality of objects, and the detection data can include a respective confidence score for each of the plurality of bounding boxes. The animated image data can include at least one of graphics interchange format data or video data. The foreground subject can include at least a portion of a person.

Another example aspect of the present disclosure is directed to one or more non-transitory computer-readable media that collectively store instructions that, when executed by one or more computing devices, cause the one or more computing devices to perform operations. The operations can include obtaining input data and one or more input masks. The input data can be descriptive of data with one or more occlusions, and the one or more input masks can be associated with the one or more occlusions. The operations can include processing the input data and the one or more input masks with an image augmentation model to generate intermediate data. In some implementations, the intermediate data can be descriptive of the input data with mask data associated with the one or more occlusions replaced by predicted data. The operations can include processing the intermediate data and the one or more input masks with a texture transfer block to generate refined output data. The texture transfer block can augment the masked data based at least in part on the intermediate data. The texture transfer block can generate a plurality of downsampled versions of the input data and can determine shift data for each of the plurality of downsampled versions of the input data. In some implementations, the shift data can be descriptive of source data in the input data utilized for replacing occlusion data. Respective shift data for at least one or more of the plurality of downsampled versions can be based at least in part on the intermediate data. The operations can include providing the refined output data as an output.

In some implementations, processing the intermediate data and the one or more input masks with the texture transfer block to generate the refined output data can include generating an image pyramid including the plurality of downsampled versions of the input data. The plurality of downsampled versions of the input data can be descriptive of lower resolution versions of the input data with the one or more occlusions masked. In some implementations, the shift data can include a set of integer vectors. The texture transfer block can include a plurality of upsample shifts. The plurality of upsampled shifts can include scaling the shift data based at least in part on a resolution difference between downsampled versions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
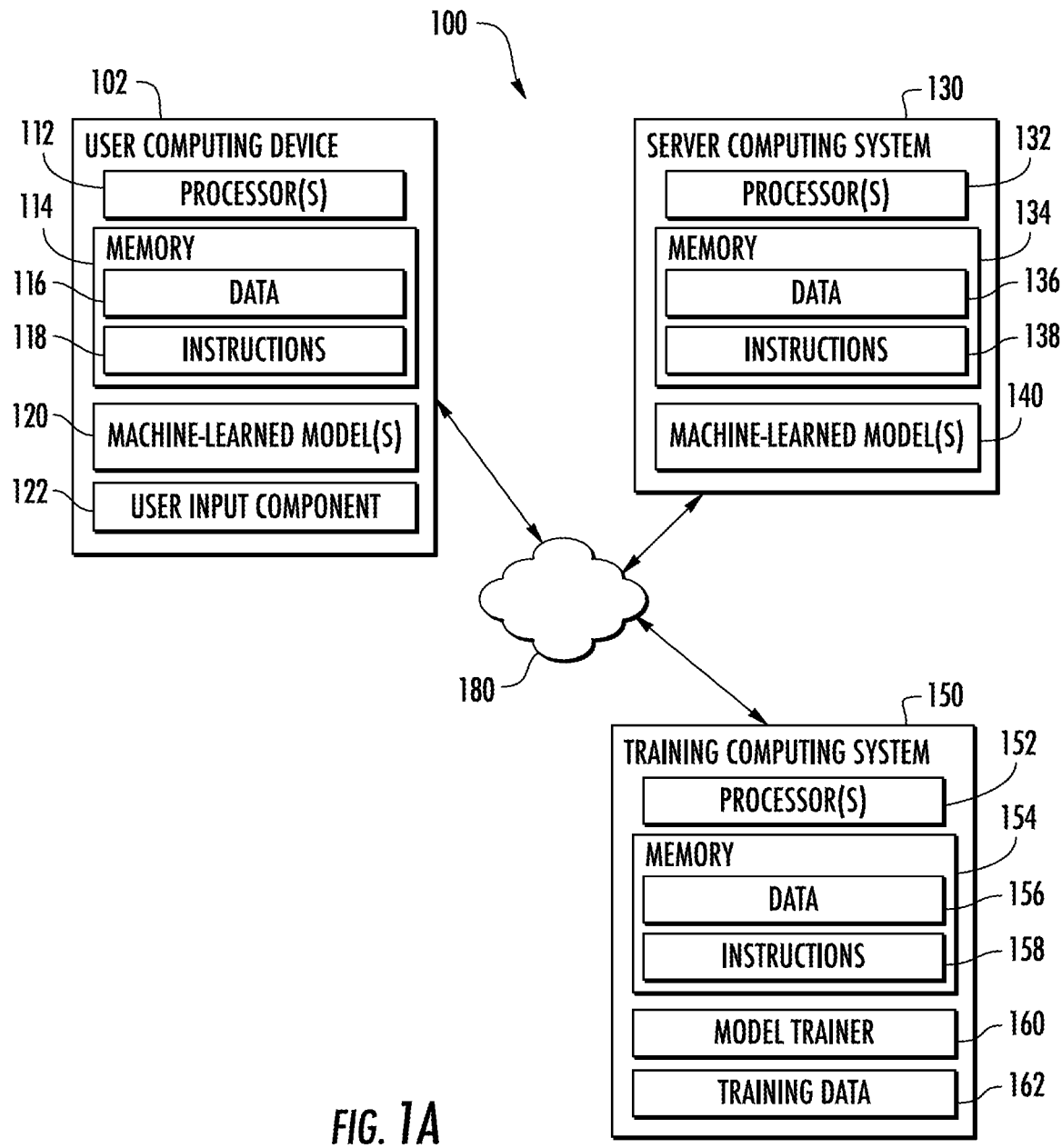
FIG. 1A depicts a block diagram of an example computing system that performs image augmentation according to example embodiments of the present disclosure.

Reference numerals that are repeated across plural figures are intended to identify the same features in various implementations.

DETAILED DESCRIPTION

Overview

Generally, the present disclosure is directed to systems and methods for image augmentation with high resolution texture transfer. In particular, the systems and methods disclosed herein can leverage an input mask, a machine-learned augmentation model, and texture transfer to augment an input image. In some implementations, the systems and methods can be utilized to generate high resolution augmented images that include one or more pixels that replace one or more pixels from the input image.

For example, the systems and methods disclosed herein can include obtaining an input image and one or more input masks. The input image can depict one or more objects in a scene. The input image and the one or more input masks can be processed with an image augmentation model to generate an intermediate image. In some implementations, the intermediate image can depict the scene with masked pixels replaced by predicted pixels. The masked pixels can be associated with the one or more objects. The input image and the intermediate image can be processed with a texture transfer block to generate a refined augmented image. The texture transfer block can augment the masked pixels based at least in part on the intermediate image. The refined augmented image can be provided as an output.

In some implementations, the systems and methods can obtain input data and one or more input masks. The input data can be descriptive of data with one or more occlusions. Additionally and/or alternatively, the one or more input masks can be associated with the one or more occlusions. In some implementations, the one or more input masks can be obtained in response to one or more user inputs. For example, a user can select (e.g., a user can draw a circle around an object they wish to remove via one or more user interface features) an object and/or a portion of the input data to replace with predicted data (e.g., predicted pixels). In some implementations, the input data can be processed with a detection model and/or a segmentation model to generate one or more annotations for the input data. The user may select one or more of the annotations, which can then be utilized to obtain and/or generate the one or more input masks.

The input data can include one or more input images. The input image and one or more input masks can be obtained. The input image can depict one or more objects (e.g., one or more occlusions, which can include people, animals, light poles, cars, trash, etc.) in a scene (e.g., the area around a monument, a tourist attraction, etc.). In some implementations, the one or more input masks can identify masked pixels that correspond to the one or more objects in the scene. In some implementations, the one or more input masks can include a subject mask and one or more occlusion masks. The subject mask can be associated with a foreground object in the scene. In some implementations, the one or more occlusion masks can be associated with one or more occlusions in the input image. In some implementations, the one or more input masks can include a bystander mask and a main subject mask. The main subject mask can be subtracted from the bystander mask to generate a distractor mask for processing.

In some implementations, obtaining the input image can include processing the input image with an image segmentation model to generate the one or more segmentation masks associated with the one or more objects in the scene. The input image can be provided for display with one or more annotations. The one or more annotations can be associated with the one or more segmentation masks. One or more selections associated with the one or more annotations can be received. The systems and methods can then determine the one or more input masks based on the one or more selections. In some implementations, the one or more annotations can include one or more highlighted portions of the scene. Additionally and/or alternatively, the one or more highlighted portions can be associated with the one or more objects. The one or more segmentation masks can be generated based at least in part on one or more bounding boxes generated by a machine-learned detection model.

The input data (e.g., the input image) and the one or more input masks can be processed with an image augmentation model to generate intermediate data (e.g., an intermediate image). The intermediate data can be descriptive of the input data (e.g., the scene with the one or more objects replaced by predicted pixels) with the one or more occlusions replaced by predicted data. For example, the intermediate data can include an intermediate image that depicts the scene with the masked pixels replaced by predicted pixels. In some implementations, the image augmentation model can include an augmentation model configured to augment the image at a 512×512 resolution.

Additionally and/or alternatively, the input data, the intermediate data, and the one or more input masks can be processed with a texture transfer block to generate refined output data. The texture transfer block can augment the masked data based on surrounding data in the intermediate data. The texture transfer block can transfer high resolution pixels to the one or more occlusion areas. The texture transfer block can be a non-machine-learning block and may be of low computational cost. In some implementations, the texture transfer block can be utilized to determine a set of data (e.g., a set of pixels) from the input data to be copied and utilized to replace data (e.g., pixels) associated with the one or more occlusions. Additionally and/or alternatively, processing the intermediate data and the input data with the texture transfer block can include performing a texture transfer algorithm on masked pixels of the input image using the predicted pixels of the intermediate image as a target.

For example, the intermediate data can be processed with a texture transfer block to generate a refined augmented image. The texture transfer block can augment the predicted pixels based on surrounding pixels in the output data. In some implementations, the texture transfer block can be configured to determine one or more replacement pixels based on a proximity to one or more occlusion pixels. The one or more replacement pixels can be within a threshold proximity to the one or more occlusion pixels. Additionally and/or alternatively, the one or more occlusion pixels can be associated with the one or more objects. Processing the intermediate data and the one or more input masks with the texture transfer block to generate the refined output data can include generating a plurality of downsampled versions of the input data. Replacement data for replacing the predicted data can be determined based at least in part on the plurality of downsampled versions. In some implementations, the texture transfer block can include a plurality of upsample shifts. The plurality of upsampled shifts can include scaling shift data based at least in part on a resolution difference between downsampled versions. For example, the texture transfer block can generate a plurality of downsampled versions of the input data and can then determine shift data for each of the plurality of downsampled versions of the input data. The shift data can be descriptive of source data in the input data utilized for replacing occlusion data. Respective shift data for at least one or more of the plurality of downsampled versions can be based at least in part on the intermediate data. The texture transfer block can begin with determining shift data of the lowest resolution version and can then update the shift data as higher resolution versions are processed. In between processing of the different downsampled versions, the shift data may be upsampled to adjust for the change in resolution or size.

The texture transfer block can include a color shift block. The color shift block can be configured to synthesize the color of the inpainted area (e.g., the area in which pixels are being replaced) to provide smoothness. The color shift block can mitigate and/or eliminate smoothness cost. In some implementations, the color shift block can generate a high contrast output, which can be processed to determine artifacts in the scene that need to be further adjusted due to lingering color irregularities.

In some implementations, the texture transfer block can run at higher resolutions than the image augmentation model (e.g., 3000×4000). Additionally and/or alternatively, the texture transfer block may use the output data as a guide to copy surrounding pixels to the originally occluded area. The texture transfer block can prioritize nearby pixels, which can make results more semantically accurate.

Additionally and/or alternatively, processing the intermediate data with the texture transfer block to generate the refined augmented image can include generating a lower resolution version of the intermediate data. The systems and methods can include determining a first pixel in the intermediate data to replace. The systems and methods can determine a second pixel in the lower resolution version that is associated with the first pixel in the intermediate data. In some implementations, the systems and methods can include determining one or more third pixels are adjacent to the second pixels. The refined augmented image can be generated based at least in part on the one or more third pixels. For example, the texture transfer block can be configured to construct an image pyramid of the input image at different resolutions and/or different sizes. The texture transfer block can then utilize the image pyramid to determine the replacement pixels. The process can involve starting with the lowest resolution and/or the lowest size and then optimizing. Once optimized, the texture transfer block can include an upsample shift to the next image version. In some implementations, the previous level of processing can be utilized to initialize shifts.

Additionally and/or alternatively, the texture transfer block can leverage the one or more input masks for data prediction. For example, the texture transfer block can replace data in the distractor mask and can avoid replacing data from the subject mask.

In some implementations, the intermediate data may be cropped before being processed by the texture transfer block. The intermediate data can be cropped into a patch at a fixed size. Alternatively and/or additionally, the intermediate data can be cropped into one or more patches based on the size of the occlusions. In some implementations, a patch may be generated for each occlusion in the input data. Alternatively and/or additionally, if one or more occlusions (e.g., distractors) are in a same region, a singular patch may be generated. Alternatively and/or additionally, the input image may be cropped before processing with the image augmentation model. The resulting intermediate image patch can then be utilized to replace a portion of the input image before processing the data with the texture transfer block. In some implementations, both the image augmentation model and the texture transfer block may process patches, and the refined augmented image patch can then be utilized to generate the refined augmented image.

In some implementations, processing the intermediate image with the texture transfer block to generate the refined augmented image can include generating an image pyramid based on the input image and the one or more input masks. The image pyramid can include the input image and a plurality of downsampled versions of the input image. Generating the image pyramid can include processing the input image and the one or more input masks to generate a downsampled image (e.g., the second downsampled image). The downsampled image can be generated by weighting pixels of the input image to reduce the resolution by half. For example, every other pixel may be weighted to downsize the image by half. In some implementations, the pixels associated with masked regions may be given a weight of zero. The masked regions can be pixels covered by an occlusions segmentation mask. The downsampled image can then be processed to generate a downsampled version (e.g., first downsampled image) of the downsampled image. The process can be repeated iteratively (e.g., until a lowest resolution image is generated (e.g., a 5×5 image)).

The image pyramid can then be utilized to determine shift data, which can be iteratively upsampled and updated. The processing can begin with the lowest resolution image in the image pyramid to generate initial shift data, which can then be upsampled and then utilized to determine updated shift data associated with a second lowest resolution image. The process can be repeated until shift data is determined for the input image resolution. In some implementations, upsampling the shift data can include scaling the shift data based on a change in resolution of the image being processed (e.g., the shift data may be multiplied by two in response to the image resolution of the newly processed image being two times that of the previously processed image. Additionally and/or alternatively, the shift data may be based in part on the output of the image augmentation model for all images in the image pyramid that have less and/or the same resolution as the output (e.g., the intermediate image) of the image augmentation model. The output of the image augmentation model can be the target for the optimization of the downsampled images. Determining the shift data can include selecting pixels adjacent to the occlusion pixels being replaced. In some implementations, the shift data can include data descriptive of pixels to be copied, such that the copied pixels are within a threshold proximity to the area being inpainted. The shift data can be further determined based on selecting pixels to copy such that the output matches the intermediate image generated by the image augmentation model. The shift vector values outside of the inpainting region can be zero.

In some implementations, shift data can include a set of vectors descriptive of the pixels in the image that are copied and placed in the occlusion region in order to replace the pixels associated with the one or more occlusions. The set of vectors can be integer vectors that begin at a source pixel and end at the location of the paste/replacement.

For example, the texture transfer block can process a first downsampled image in the image pyramid to generate a first output (e.g., an augmented first downsampled image in which one or more occlusion pixels are replaced with predicted source pixels). The first output can include first shift data. The first shift data can be descriptive of a set of first vectors associated with the copying and placing of pixels for replacing occlusion pixels.

Additionally and/or alternatively, the texture transfer block can generate upsampled first shift data based at least in part on the first shift data and a resolution difference between the first downsampled image and the second downsampled image. In some implementations, the first downsampled image can be of lower resolution than the second downsampled image.

In some implementations, the texture transfer block can process the upsampled first shift data and a second downsampled image in the image pyramid to generate a second output (e.g., an augmented second downsampled image in which one or more occlusion pixels are replaced with predicted source pixels). The second output can include second shift data. The second shift data can be determined based at least in part on the upsampled first shift data and the intermediate image.

The refined augmented image data can then be generated based at least in part on the input image and upsampled second shift data.

The systems and methods can provide the refined output data (e.g., the refined augmented image) as an output.

The systems and methods disclosed herein can be configured to enable the removing of distractor objects from an image or video while utilizing limited computing resources. In some implementations, the systems and methods disclosed herein can be executed by a mobile computing device.

In some implementations, the systems and methods disclosed herein can be utilized to generate an animated image from a single image frame. For example, the systems and methods can include obtaining an input image and one or more input masks. The input image can be descriptive of a foreground subject in a scene. The input image and the one or more input masks can be processed with an image augmentation model to generate a plurality of augmented frames. In some implementations, each frame of the plurality of augmented frames can be descriptive of the foreground subject with a second perspective of the scene. The plurality of augmented frames can be processed with a texture transfer block to generate animated image data. In some implementations, the texture transfer block can augment one or more predicted pixels of each frame of the plurality of augmented frames based on surrounding pixels in the respective frame. Additionally and/or alternatively, the systems and methods can include providing the animated image data as an output.

In some implementations, the systems and methods can obtain the input image from a photo gallery. The photo gallery can include a plurality of user images. The input image can be processed with a detection model to generate detection data. In some implementations, detection data can include data descriptive of a location for the foreground subject. The one or more input masks can be generated based on the detection data. In some implementations, the detection data can include a plurality of bounding boxes associated with a plurality of objects. The detection data can include a respective confidence score for each of the plurality of bounding boxes.

Alternatively and/or additionally, the systems and methods can obtain an input image and one or more input masks. The input image can be descriptive of a foreground subject in a scene. In some implementations, the foreground subject can include at least a portion of a person.

The input image and the one or more input masks can be processed with an image augmentation model to generate a plurality of augmented frames. Each frame of the plurality of augmented frames can be descriptive of the foreground subject with a second perspective of the scene. For example, each frame can include the foreground subject being of a different size and/or in a different location relative to the border of the image. The foreground subject may be larger in one frame than the next, or vice versa. Alternatively and/or additionally, a different perspective of the foreground subject may be generated in a sequential frame such that pixels may be predicted in order to generate the new perspective. The plurality of different frames can include predicted pixels of the scene and/or predicted pixels for the foreground object.

The plurality of augmented frames can then be processed with a texture transfer block to generate animated image data. The texture transfer block can augment one or more predicted pixels of each frame of the plurality of augmented frames based on surrounding pixels in the respective frame. In some implementations, the animated image data can include at least one of graphics interchange format data or video data.

The animated image data can then be provided as an output. The animated image data can be provided in a photo gallery application, an animated image application, or in any other application or interface. In some implementations, the animated image can include the foreground object growing in size or, alternatively, shrinking in size. Alternatively and/or additionally, the animated image can include a changing view point of the foreground object and the scene such that a different portion of the scene can be viewed along with a different perspective of the foreground object.

The systems and methods disclosed herein can leverage one or more machine-learned models. The one or more machine-learned models can include a bystander model, one or more detection models, one or more segmentation models, and one or more augmentation models. The bystander model can include a bystander scorer for generating bounding boxes and scores for a plurality of objects in a scene corresponding to a processed input image. The bystander scores can be associated with a predicted likelihood that that object (e.g., a person) is a bystander in the scene or the subject of the photo. The one or more detection models can include a person detector for generating bounding boxes for people in an input image. Additionally and/or alternatively, the one or more detection models can include a face detector for generating bounding boxes for faces in an input image. The one or more segmentations models can include a person segmenter for generating one or more segmentation masks associated with people in the image, a powerline segmenter for generating a segmentation masks associated with powerlines in the image, an object segmenter for generating a segmentation masks associated with objects (e.g., people, light poles, animals, buildings, trashcans, trash, benches, signs, etc.) in the image, and a portrait segmenter generating a segmentation masks associated with a face in the image. The one or more segmentation models may intake an image and/or a bounding box and may output one or more segmentation masks. In some implementations, the one or more segmentation models may process an image and a face location in order to generate a portrait segmentation mask. The one or more augmentation models can include image augmentation models, audio augmentation models, and/or text augmentation models. For example, the image augmentation model can be configured to process an input image to generate an intermediate image.

In some implementations, the systems and methods disclosed herein can leverage machine-learned models for inpainting. Images can often have one or more occlusions that a user wishes to remove or replace with predicted pixels. For example, photographs taken at landmarks can include signs, people, and other objects the user wishes to remove. Systems and methods disclosed herein can be leveraged to remove one or more unwanted objects from an image. The systems and methods can obtain input data and contextual attention data. The input data can include one or more images with one or more objects for cloning or removal, and the contextual attention data can include data descriptive of objects to remove and/or areas of an image to clone. The input data and the contextual attention data can then be processed by an augmentation model to generate an augmented image (e.g., an intermediate image). The augmented image can comprise features from the one or more images of the input data but may include cloned portions of the input image in place of the one or more objects for removal. The augmented image can then be processed with a texture transfer model to generate a refined augmented image.

The systems and methods disclosed herein can leverage one or more machine-learned models to predict occluded data and replace the occlusions with predicted data to generate augmented data. In some implementations, the one or more machine-learned models can be trained with ground truth training. Systems and methods for training an inpainting model can include receiving input data and ground truth data. The ground truth data can include un-occluded data, and the input data may include data with one or more occlusions. The input data may be generated by adding occlusions to the ground truth data. The ground truth data can be processed with a contextual attention model to generate a contextual attention output. The input data and the contextual attention output can then be processed with an augmentation model to generate prediction data. The prediction data can include data with the one or more occlusion replaced by predicted replacement data. The prediction data and the ground truth data can then be compared in order to evaluate a loss function. Based on the evaluation, one or more parameters of the augmentation model may be adjusted. The process may be repeated iteratively in order to train the augmentation model to accurately inpaint occluded data.

The trained model can then be used for a variety of inpainting tasks. The systems and methods disclosed herein can be used for augmenting a variety of data types including image data, audio data, and/or three-dimensional point cloud data. Systems and methods for inpainting with one or more machine-learned models can include obtaining input data in which the input data includes one or more occlusions for removal. The systems and methods can further include obtaining one or more user-inputs. The one or more user inputs can include one or more contextual attention inputs and may include one or more selections of portions of the input data to clone. The input data and the one or more user-inputs can be processed with an augmentation model to generate augmented data. The augmented data can include replacement data in place of the one or more occlusions. The augmented data can then be processed by the texture transfer block to generate refined augmented data. The systems and methods can further include providing the refined augmented data to a user.

In some implementations, the systems and methods can be utilized for image inpainting. For example, a user may wish to replace one or more objects in an image with predicted data in order to remove unwanted people, trash, buildings, etc. Utilization of the systems and methods for image inpainting can include receiving input data from a user, in which the input data includes one or more images. Contextual attention data can also be obtained. The contextual attention data can include selected pixel data in which the selected pixel data includes pixels in the input image. The input data can be processed with a prediction model to generate predicted contextual attention data. The predicted contextual attention data and the contextual attention data can be processed with a blend model to generate blended data. The blended data and the input image can then be processed with an occlusion model to generate an augmented image. The augmented image can include the input image with the one or more occlusions replaced with predicted data. The augmented image can then be processed with the texture transfer block to generate refined augmented data with texture synthesis. The texture transfer block can utilize the output of the augmentation model as a guide to copy surrounding pixels to the inpainted area.

Training the machine-learned models can involve receiving or obtaining input data and ground truth data. The input data and the ground truth data can include an input image and a ground truth image respectively. The ground truth image can depict a scene, and the input image can depict the scene with one or more occlusions. In some implementations, the input image can be generated by adding the occlusions to the ground truth image. Training the one or more machine-learned models can include obtaining a plurality of training sets, in which each training set includes input data and ground truth data. Alternatively and/or additionally, the input data and the ground truth data can include audio data, in which a portion of the audio data for the input data is occluded compared to the ground truth data. The occlusions can be humans, animals, buildings, and/or image capture created occlusions. In some implementations, the data can be audio data, and the occlusions can be errant sounds, equipment generated noise, white, noise, etc.

The ground truth data can be processed with a contextual attention model to generate a contextual attention output. The contextual attention model can include one or more contextual attention sub-blocks. In some implementations, the contextual attention model can include a feed-forward, fully convolutional neural network. The contextual attention model can include one or more softmax sub-blocks.

In some implementations, the contextual attention model can be trained by processing one or more training images with the contextual attention model to generate training contextual attention outputs. The training contextual attention outputs can be processed with an inpainting model to generate a training augmented image. A difference between the training augmented image and the ground truth image can then be used to evaluate a training loss function. The training loss function evaluation can then be used to adjust one or more contextual attention parameters of the contextual attention model.

The contextual attention data can include a portion of the ground truth image data generated by processing a ground truth image with a contextual attention sub-block and a convolutional neural network. Alternatively and/or additionally, the contextual attention data can include user input data that comprises one or more selections of portions of the input image to clone.

The input data and the contextual attention output can be processed with an augmentation model to generate prediction data. Prediction data can include augmented image data that replaces the one or more occlusions with predicted replacement data.

In some implementations, the augmentation model can include a prediction model, a blend model, and an occlusion model. The prediction model can process the input data to generate a contextual attention prediction. The blend model can process the predicted contextual attention data and the contextual attention output to generate blended data. The blended data can then be processed with the input data to generate the predicted image which includes the occlusion objects being replaced by cloned data.

The blend model can be trained to randomly blend the predicted contextual attention data and the contextual output data. The contextual attention data can be data generated based on user-inputs or may be automatically generated based on one or more data sets.

The prediction data and the ground truth data can then be compared in order to evaluate a loss function. The loss function may be a perceptual loss function. Alternatively, the loss function may be a Kullback-Leibler (KL) divergence loss function, a VGG loss function, or a GAN loss function. The loss function can then be used to adjust one or more parameters of the augmentation model. In some implementations, one or more parameters of at least one of the prediction model and the blend model may be adjusted in response to the loss function being evaluated.

A computing system that utilizes one or more machine-learned models to inpaint can include one or more processors and one or more non-transitory computer-readable media that collectively store instructions that, when executed by the one or more processors, cause the computing system to perform operations. The operations can include methods for inpainting.

The systems and methods can include obtaining input data. The input data can include one or more input images. The input image can include one or more objects for removal. The objects can be occlusions occluding one or more portions of the scene depicted in the image. The occlusions can include image imperfections, unwanted humans or objects captured in the image, and/or previously placed occlusions.

One or more user-inputs can then be obtained. The one or more user inputs can include one or more contextual attention inputs. For example, in some implementations, the one or more user-inputs can include selections of at least one of the occlusions or portions of an image that includes pixels the user wishes to clone.

In some implementations, the first user-input can include one or more selections of occlusions for replacement. The systems and methods can then obtain one or more second user-inputs. The one or more second user-inputs can include one or more selections of portions of the input data to clone for replacing the one or more occlusions.

The input data and the one or more user-inputs can be processed with an augmentation model to generate augmented data. The augmentation model can be trained to remove and replace the one or more objects via ground truth training. In some implementations, the augmentation model generates a predicted contextual attention output, blends the predicted contextual attention output with user-selected portions of the input data, and generates the augmented data with the blended data and the input data. The blending weight can be randomly chosen, automatically determined, or manually selected. In some implementations, the blending weight may be manually adjusted by a user via one or more inputs into a user interface. The blending weight can be preselected or may be chosen via a slide-scale feature, such that a user can view a variety of possible options based on the blending weight. Alternatively and/or additionally, the blending weight may be machine-learned. For example, in some implementations, the blending weight may be determined and adjusted based on the ground truth training and/or retrained by reinforcement training. The blending weight may be adjusted based on previous user interactions, such that the blend model is adjusted to be tailored towards user preferences. The blending can include semantically blending the data. In some implementations, the blending can involve attention pooling.

The augmented data can then be processed with the texture transfer block to generate the refined augmented data. The refined augmented data can then be provided to the user. The refined augmented data can include an augmented image in which portions of the input image are replaced with predicted data to replace one or more objects in the input image. The refined augmented image can be provided via a visual display, in which the visual display is part of a computing device. In some implementations the computing device can be a mobile computing device.

In some implementations, the systems and methods disclosed herein can be implemented into a mobile computing device. For example, the input data can be obtained from one or more sensors stored in the mobile computing device (e.g., image data obtained with one or more image sensors, audio data obtained with one or more audio sensors, etc.). The one or more user-inputs can be one or more touch inputs on a touchscreen display, and the augmented data can be provided via one or more output components in the mobile computing device (e.g., an augmented image displayed on a visual display, augmented audio played over one or more speakers, etc.).

In some implementations, the systems and methods disclosed herein can be provided via a user interface. For example, the user interface can include one or more visual interface features. More specifically, the input data can include an image, which can be provided for display. The user interface can then allow for the user to select one or more portions of the image to select for replacement. The user interface may also allow a user to select one or more portions of the image to clone in order to replace the one or more previously selected portions. The input image and the user-inputs can then be processed to generate the refined augmented image, which is then provided for display via the visual interface.

Moreover, in some implementations, when a user-input is provided, one or more representations may be displayed over the input image. For example, in response to an occlusion being selected for removal, a silhouette of the occlusion may be displayed overlayed over the input image to provide visual feedback of what was selected. The silhouette may be colored in one or more colors, may be opaque or partially transparent, and/or may be labeled. Alternatively and/or additionally, the user-inputs may be displayed similarly to painting over the input image such that the first user-inputs and/or the second user-inputs may be displayed similarly to a brush tool response in a painting application. The first user-inputs and the second user-inputs may be displayed in differing colors or styles.

In some implementations, the systems and methods disclosed herein can be used to move objects in an image and may be used to generate videos of an object moving throughout a scene. For example, the user may select one or more objects to segment and move to a different portion of the image. The portion of the image originally including the one or more objects can then be inpainted using the systems and methods disclosed herein. These systems and methods can also be used for resizing the objects in the image, and inpainting the now augmented portions of the image.

The one or more objects, or occlusions, can be selected by autorecognition, a lasso gesture, a manual brush input, or via a variety of other selection techniques. In some implementations, the lasso gesture can be aided by object recognition processes. Autorecognition can involve training one or more machine-learned models to identify the foreground and background of images. The one or more machine-learned models may be trained to further determine people or objects of interest. The one or more machine-learned models may also learn from past user interactions, which objects or features a user often selects for removal (e.g., trash cans, logos, image or facial imperfections, etc.). The one or more machine-learned models may also be trained to learn which people and objects are acceptable for maintaining in future input images.

In some implementations, the systems and methods disclosed herein can include flattening an input tensor, processing the flattened input tensor with a contextual attention matrix to generate a transformed input, and the transformed input can then be deflattened to generate an output tensor.

The contextual attention model and the augmentation model may be trained simultaneously or separately. In some implementations, the contextual attention model can be trained before training the augmentation model.

In some implementations, the augmentation model and/or the texture transfer block can utilize input mask targets for augmentation. Additionally and/or alternatively, the systems and methods disclosed herein may utilize image segmentation masks for segmenting portions of images for image inpainting tasks.

The systems and methods of the present disclosure provide a number of technical effects and benefits. As one example, the inpainting machine-learning system can aid in computing performance by refining parameters of the predictions completed for the creation of the replacement data. Thus, the performed inpainting can be higher quality (e.g., more accurate) than previous techniques, which represents an improvement in the performance of a computing system. Further, the proposed approaches may eliminate the need to create such a large spectrum of predictions to be evaluated, which is required by certain existing techniques. Eliminating the need to create a large number of different predictions can result in savings of computing resources such as processor usage, memory usage, and/or network bandwidth usage. The use of ground truth data also removes some confusion from the training and makes the training more efficient, thereby conserving computing resources. The trained system may reduce the amount of computing resources utilized versus previous systems.

As the implementation of machine learning also eliminates the need to manually edit every occurrence of unwanted data in an image, more efficiency may be added. The system may also eliminate the need for a coder to write a long drawn out code, run the code, refine the code, and continually supervise performance.

Further, the system and method described herein may be used in any process in which an image is used as an input to a system, to provide higher quality input images to the system. Non-limiting examples of possible applications include: medical images, such as X-ray images or a scan image of a patient; monitoring the condition of an item of machinery, where images of the item of machinery are acquired regularly and are used to determine when a component is likely to require repair or replacement; and an autonomous vehicle that makes decisions on its course and speed based on images that it acquires of its surrounding.

The lightened computational cost of the systems and methods disclosed herein can allow for the systems and methods disclosed herein to be used with a mobile computing device to allow for image inpainting to be completed in the palm of a user's hand.

The systems and methods of the present disclosure provide a number of technical effects and benefits. As one example, the system and methods can be utilized to remove one or more occlusions from an image and replace the occlusions with pixels copied from a neighboring area. The systems and methods can predict pixels that can be accurate and may provide smooth transitions. Additionally and/or alternatively, the systems and methods can provide an output of the same or comparable resolution to the input.

Another example technical effect and benefit relates to improved computational efficiency and improvements in the functioning of a computing system. For example, a technical benefit of the systems and methods of the present disclosure is the ability to reduce the computational resources needed for replacing occlusions in an image with predicted data. In particular, the texture transfer block can be computationally cheap, which can allow the systems and methods to be executed on a computing device with limited computational resources (e.g., a mobile computing device).

With reference now to the Figures, example embodiments of the present disclosure will be discussed in further detail.

Example Devices and Systems

FIG. 1A depicts a block diagram of an example computing system 100 that performs image augmentation and texture transfer according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more augmentation models 120. For example, the augmentation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example augmentation models 120 are discussed with reference to FIGS. 2A-5.

In some implementations, the one or more augmentation models 120 can be received from the server computing system 130 over network 180, stored in the user computing device memory 114, and then used or otherwise implemented by the one or more processors 112. In some implementations, the user computing device 102 can implement multiple parallel instances of a single augmentation model 120 (e.g., to perform parallel image augmentation across multiple instances of images with occlusions).

More particularly, the augmentation model can process input data and one or more input masks to generate intermediate data. The intermediate data can then be processed with a texture transfer block to generate refined output data.

Additionally or alternatively, one or more augmentation models 140 can be included in or otherwise stored and implemented by the server computing system 130 that communicates with the user computing device 102 according to a client-server relationship. For example, the augmentation models 140 can be implemented by the server computing system 140 as a portion of a web service (e.g., an augmentation and texture transfer service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned augmentation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2A-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the augmentation models 120 and/or 140 based on a set of training data 162. The training data 162 can include, for example, one or more ground truth segmentation masks and one or more ground truth images. For example, the systems and methods can obtain ground truth data (e.g., one or more ground truth images and one or more ground truth segmentation masks) which can be compared against generated outputs in order to evaluate a loss. The evaluation can then be utilized to adjust one or more parameters of the augmentation model.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate an upscaled speech output (e.g., speech data that is higher quality than the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a prediction output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
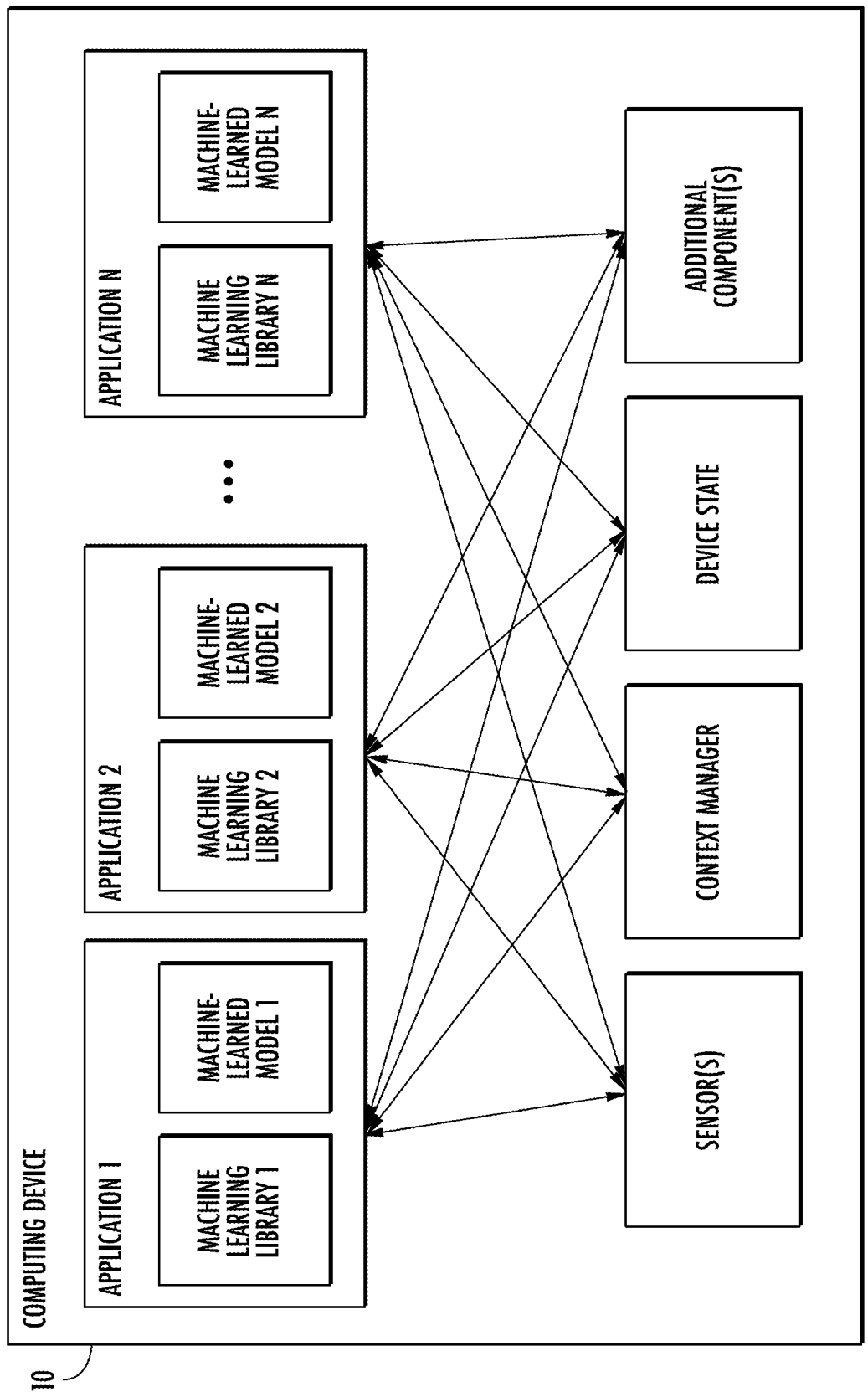
FIG. 1B depicts a block diagram of an example computing device that performs image augmentation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
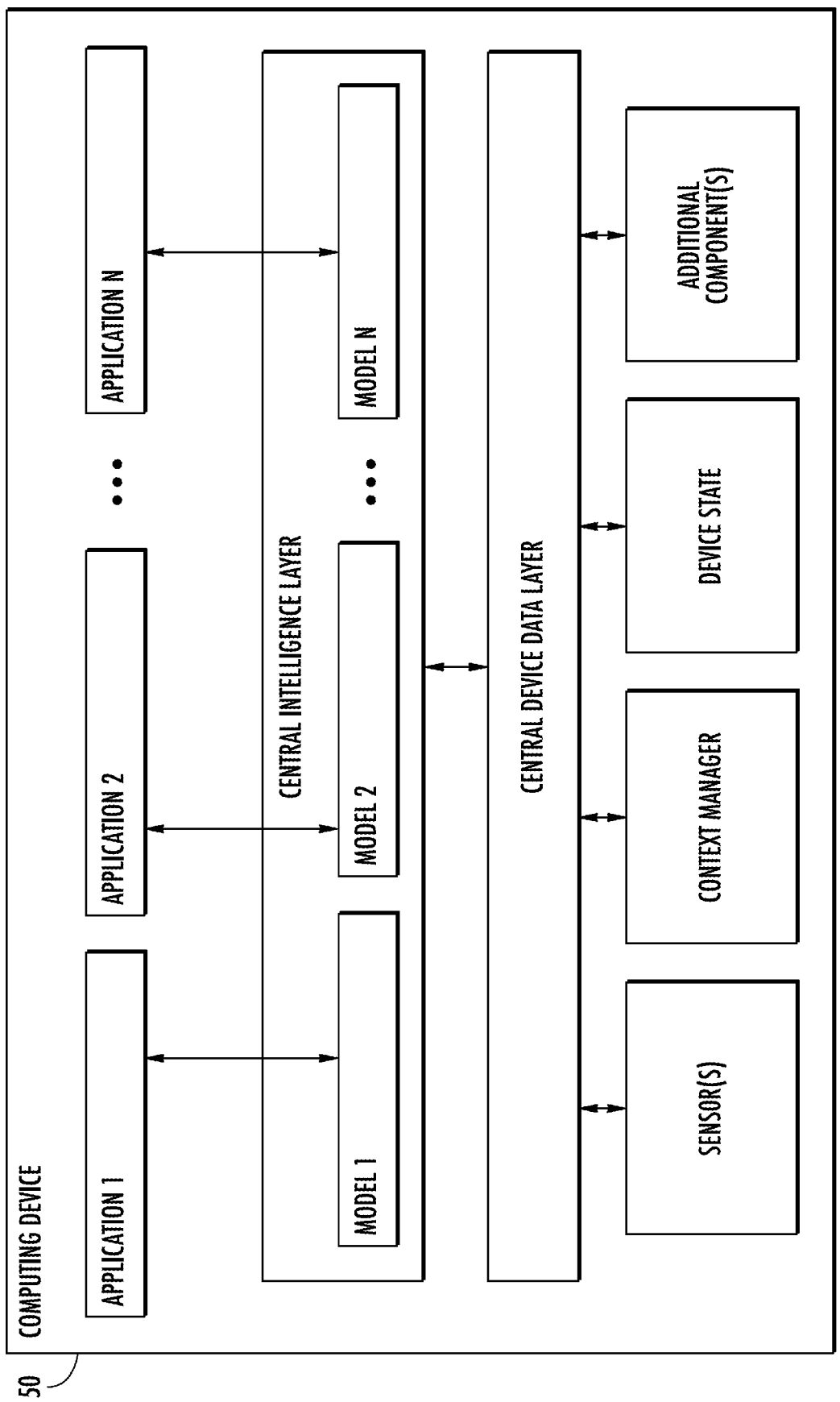
FIG. 1C depicts a block diagram of an example computing device that performs image augmentation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2A:
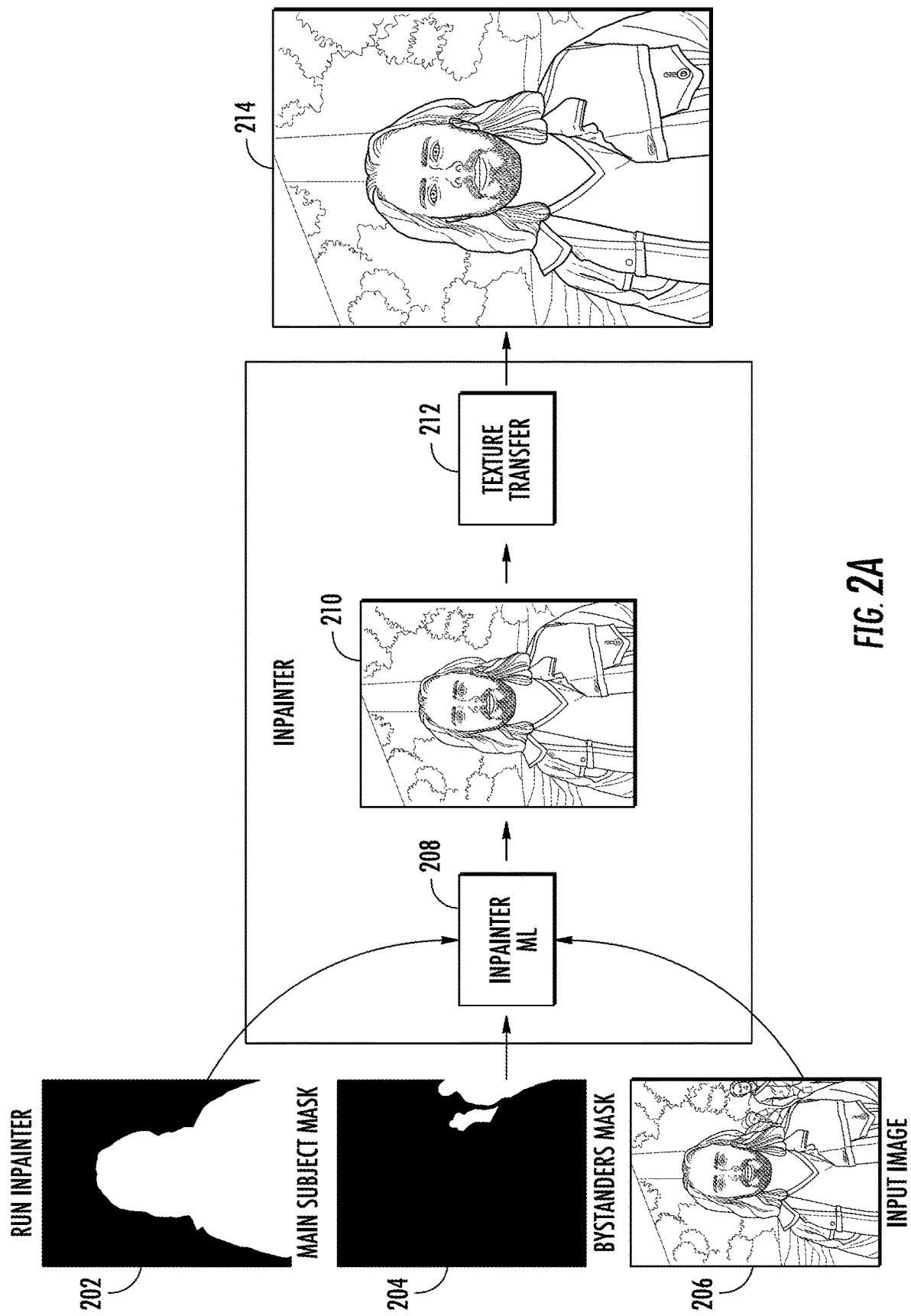
FIG. 2A depicts a block diagram of an example augmentation model according to example embodiments of the present disclosure.

FIG. 2A depicts a block diagram of an example augmentation model 200 according to example embodiments of the present disclosure. In some implementations, the augmentation model 200 is trained to receive a set of input data 202, 204, & 206 descriptive of an input image 206 and one or more masks 202 & 204 and, as a result of receipt of the input data 202, 204, & 206, provide output data 214 that is descriptive of the input image 206 with one or more occlusions replaced with predicted pixels. Thus, in some implementations, the augmentation model 200 can include an inpainting model 202 (e.g., an image augmentation model) that is operable to generate intermediate data 210 descriptive of a first augmented image.

In particular, FIG. 2A can depict an augmentation model 200 that can replace image pixels associated with one or more occlusions with predicted pixel data. For example, a main subject mask 202, a bystanders mask 204, and an input image 206 can be obtained. The main subject mask 202 can be descriptive of a silhouette of a main subject in the input image 206. The bystanders mask 204 can be descriptive of one or more silhouettes associated with one or more occlusions in the input image 206. The main subject mask 202 and the bystanders mask 204 can be generated by processing the input image 206 with one or more segmentation models, one or more bystander models, and/or one or more detection models.

The main subject mask 202, the bystanders mask 204, and the input image 206 can be processed with an inpainting model 208 to generate intermediate data 210. The intermediate data 210 can be descriptive of the input image 206 with one or more occlusions (e.g., one or more occlusions associated with masked pixels masked by the input masks) replaced with initial prediction data. The intermediate data 210 can then be processed with a texture transfer block 212 to generate output data 214. The output data 214 can be descriptive of the input image 206 with the one or more occlusions replaced with second predicted pixels. In some implementations, the output data 214 can be descriptive of an upsampled version of the intermediate data 210 with texture synthesis.

Figure 2B:
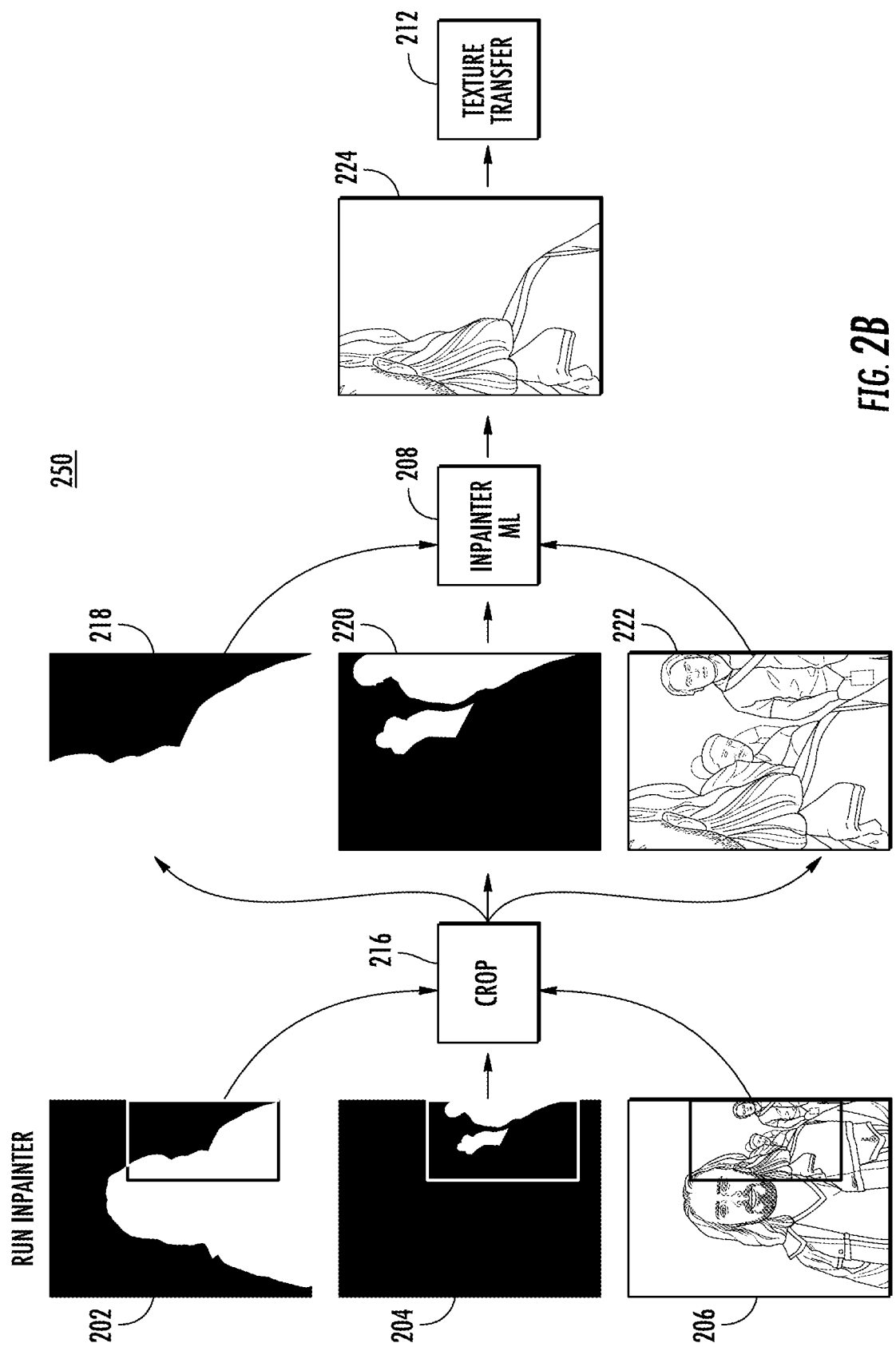
FIG. 2B depicts a block diagram of an example augmentation model according to example embodiments of the present disclosure.

FIG. 2B depicts a block diagram of an example augmentation model 250 according to example embodiments of the present disclosure. The augmentation model 250 is similar to the augmentation model 200 of FIG. 2A except that the augmentation model 250 further includes a cropping block 216. For example, in some implementations, the systems and methods disclosed herein can crop the main subject mask 202, the bystanders mask 204, and the input image 206 with the crop block 216 to isolate a region with occlusions for replacement. In particular, the main subject mask 202, the bystanders mask 204, and the input image 206 can be cropped into a patch that includes occlusion region and one or more surrounding pixels.

The cropped main subject mask 218, the cropped bystanders mask 220, and the cropped input image 222 can be processed with the inpainting model 208 to generate patch intermediate data 224. The patch intermediate data 224 can be descriptive of the cropped input image 222 with one or more initial replacement pixels. The patch intermediate data 224 can be processed with a texture transfer block 212 to generate refined patch output data. The refined patch output data can include the cropped input image 222 with one or more second replacement pixels with texture synthesis. In some implementations, the second replacement pixels and/or initial replacement pixels can include pixels copied from surrounding pixels in the cropped input image 222. The refined patch output data can then be concatenated and/or overlayed over the input image 206 in order to generate the refined augmented image.

Figure 3A:
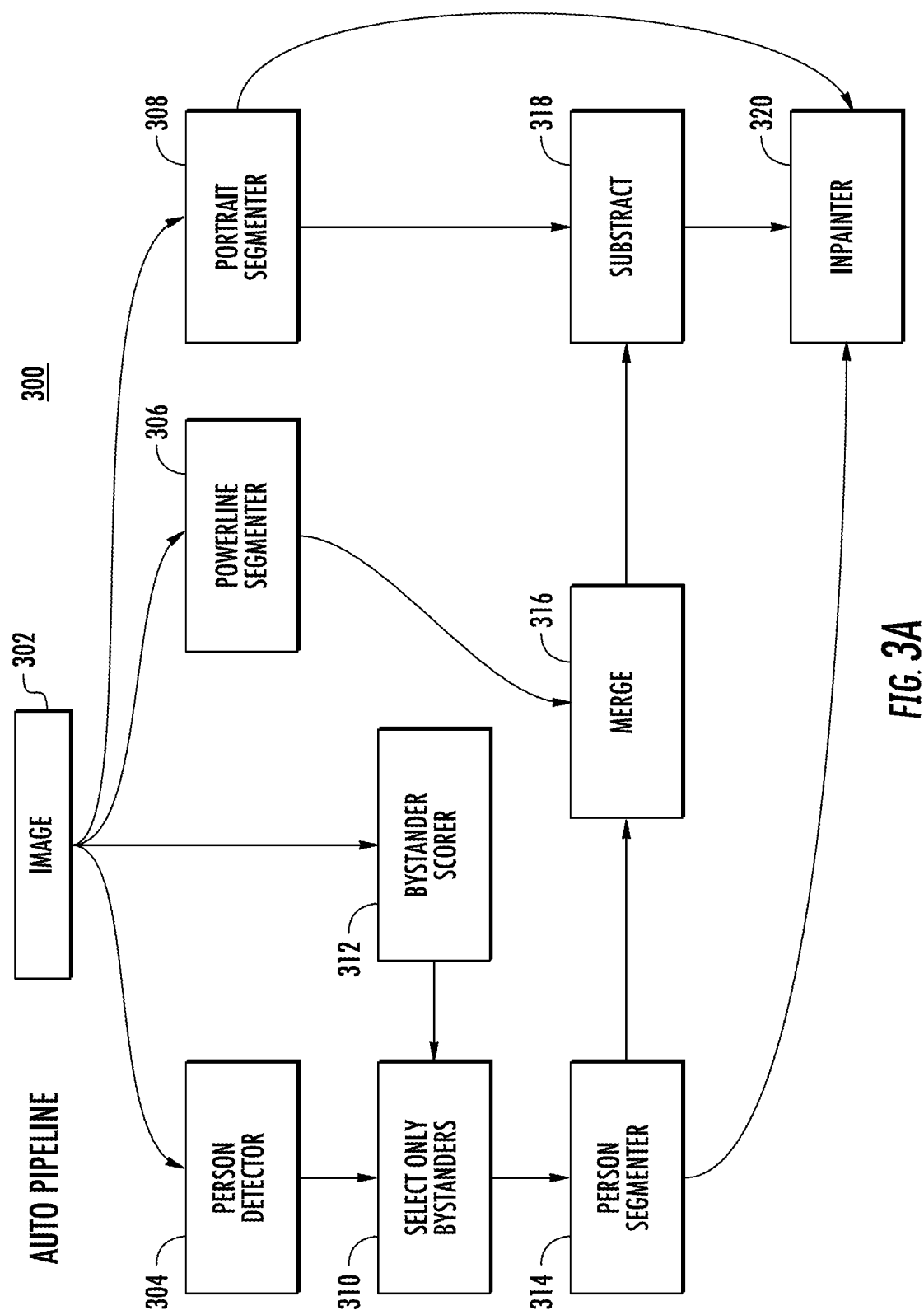
FIG. 3A depicts a block diagram of an example automatic pipeline according to example embodiments of the present disclosure.

FIG. 3A depicts a block diagram of an example automatic pipeline 300 according to example embodiments of the present disclosure. In particular, the automatic pipeline 300 can include one or more bystander models 312, one or more detection models (e.g., a person detector model 304), one or more segmentation models (e.g., a person segmenter model 314, a powerline segmenter model 306, and a portrait segmenter model 308), and an inpainting model 320.

For example, an image 302 can be processed with a person detector model 304 to generate one or more person bounding boxes associated with one or more people in the image 302. Separately and/or in parallel, the image 302 can be processed with a bystander model 312 to generate one or more bystander scores and one or more bystander bounding boxes. The one or more bystander scores can be descriptive of a likelihood an object in a bystander bounding box is a subject of the image 302 or a bystander. The one or more person bounding boxes, the one or more bystander scores, and the one or more bystander bounding boxes can be processed to determine one or more bystanders 310 in the image 302. The image 302 and data associated with the one or more bystanders 310 can be processed with a person segmenter model 314 to generate one or more bystander segmentation masks.

In some implementations, the image 302 can be processed with a powerline segmenter model 306 to generate one or more powerline segmentation masks associated with the powerlines in the image 302. The powerline segmentation mask and the one or more bystander segmentation masks can then be merged 316 to generate an all-encompassing occlusion mask.

The image 302 can be further processed with a portrait segmenter model 308 to generate one or more main subject masks associated with one or more foreground subjects in the image 302. The one or more main subject masks can be subtracted 318 from the all-encompassing mask to generate an input mask. The input mask and the image 302 can then be processed with an inpainting model 320 and a texture transfer block to generate a refined augmented image. Alternatively and/or additionally, the inpainting model 320 and the texture transfer block can process the image 302, the one or more bystander segmentation masks, the powerline segmentation mask, and the one or more portrait segmentations masks to generate the refined augmented image.

Figure 3B:
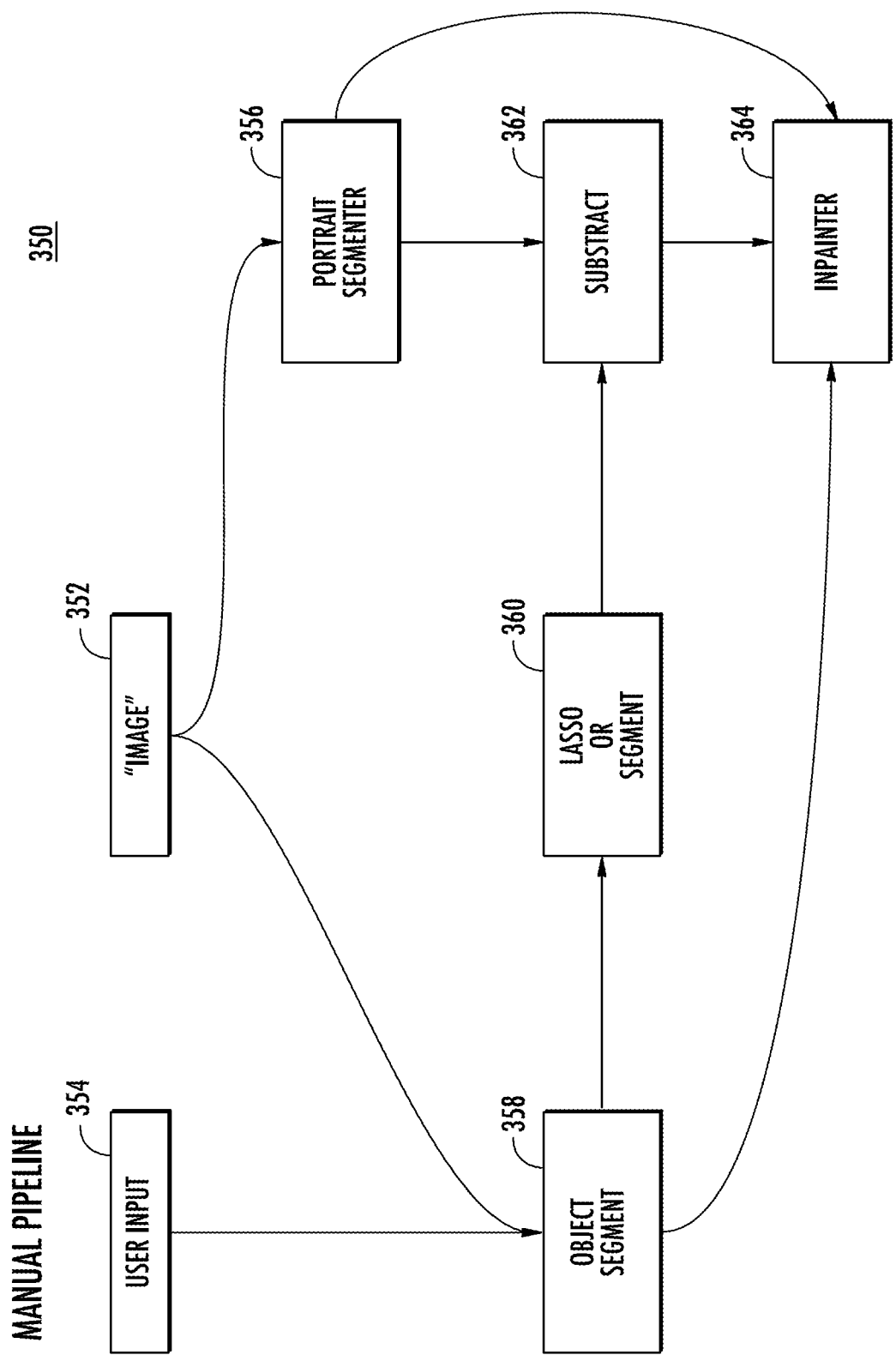
FIG. 3B depicts a block diagram of an example manual pipeline according to example embodiments of the present disclosure.

FIG. 3B depicts a block diagram of an example manual pipeline 350 according to example embodiments of the present disclosure. The manual pipeline 350 is similar to the automatic pipeline 300 of FIG. 3A except that the manual pipeline 350 includes multiple inputs for processing. The manual pipeline 350 can include one or more segmentation models (e.g., an object segmenter model 358 and a portrait segmenter model 356) and an inpainting model 364. The image 352 and user input data 354 can be processed with an object segmenter model 358 to generate one or more occlusion segmentation masks 360 associated with one or more objects the user input data 354 selects for replacement. The user input data 354 can include data associated with a tap selection, a lasso selection, or any other form of selection.

The image 352 can be further processed with the portrait segmenter model 356 to generate one or more foreground subject masks associated with one or more foreground objects (e.g., a foreground portrait). The one or more foreground subject masks can be subtracted 362 from the one or more occlusion masks 360 to generate one or more input masks. The image 352 and the one or more input masks can be processed with the inpainting model 364 and a texture transfer block to generate a refined augmented image. Alternatively and/or additionally, the image 352, the one or more occlusion masks 360, and the one or more foreground subject masks can be processed with the inpainting model 364 and the texture transfer block to generate the refined augmented image.

Figure 4A:
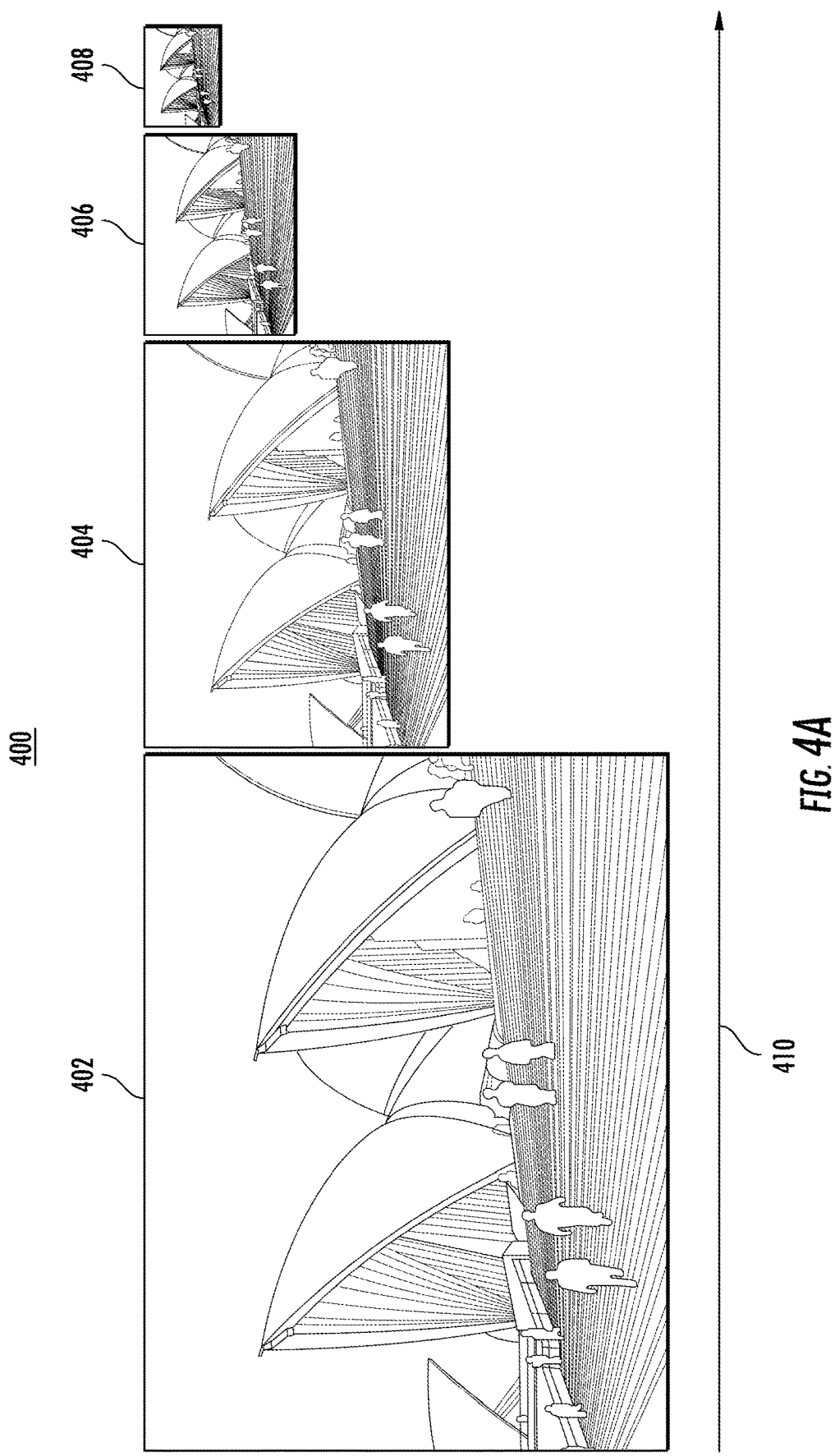
FIG. 4A depicts an illustration of an example image pyramid according to example embodiments of the present disclosure.

FIG. 4A depicts an illustration of an example image pyramid 400 according to example embodiments of the present disclosure. The image pyramid 400 can be generated by and/or for the texture transfer block to complete inpainting. For example, the input image 402 can be duplicated and downsampled 410 to a lower resolution and/or duplicated in a smaller size. A first downsampled image 404 can be utilized to determine replacement pixels for the input image 402. Similarly, the second downsampled image 406 can be utilized to determine replacement pixels for the first downsampled image 404, and the third downsampled image 408 can be utilized to determine replacement pixels for the second downsampled image 406.

In some implementations, processing the input image and the intermediate image with the texture transfer block to generate the refined augmented image can include generating an image pyramid based on the input image and the one or more input masks. The image pyramid can include the input image and a plurality of downsampled versions of the input image. Generating the image pyramid can include processing the input image and the one or more input masks to generate a downsampled image (e.g., the second downsampled image). The downsampled image can be generated by weighting pixels of the input image to reduce the resolution by half. For example, every other pixel may be weighted to downsize the image by half. In some implementations, the pixels associated with masked regions may be given a weight of zero. The masked regions can be pixels covered by an occlusions segmentation mask. The downsampled image can then be processed to generate a downsampled version (e.g., first downsampled image) of the downsampled image. The process can be repeated iteratively (e.g., until a lowest resolution image is generated (e.g., a 5×5 image)).

Figure 4B:
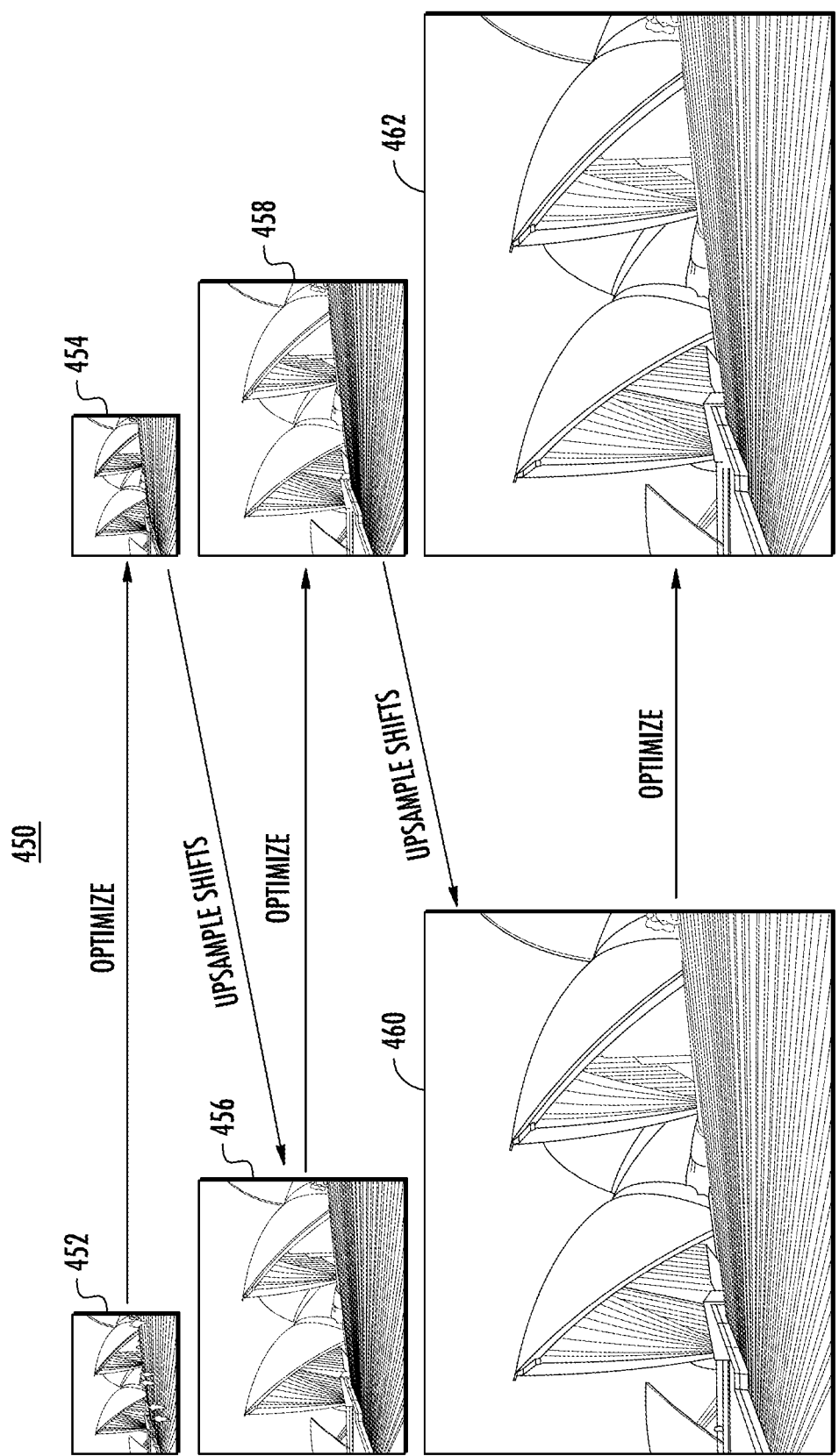
FIG. 4B depicts an illustration of an example optimization and upsampling process according to example embodiments of the present disclosure.

FIG. 4B depicts an illustration of an example optimization and upsampling process 450 according to example embodiments of the present disclosure. In some implementations, the optimization and upsampling process 450 can utilize the image pyramid 400 for texture transfer block processing. For example, the first image 452 can correspond with the second downsampled image 406, the second image 454 can correspond with the first downsampled image 404, and the third image 460 can correspond with the input image 402.

The texture transfer block can optimize (e.g., generate an augmented version with one or more pixels replaced by pixels copied from other pixels in the image) the first image 452 to generate a first optimized image 454. The first optimized image 454 can be generated based on first shift data (e.g., a set of vectors descriptive of the source pixels utilized for inpainting) which can be upsampled to aid in second image 456 processing. Upsampling can involve scaling the set of vectors based on the change in resolution between the first image 452 and the second image 456. The second image 456 can then be optimized to generate a second optimized image 458 based on the first shift data and an output of the image augmentation model. The second optimized image 458 can include second shift data, which can be upsampled to aid in third image 460 processing. The third image 460 can then be optimized to generate the refined augmented image 462.

In some implementations, the texture transfer block can start with the lowest resolution in the image pyramid 400. For each pixel in the occlusion area, a pixel to copy can be determined to replace the occlusion pixel. Additionally and/or alternatively, the copied pixels may be within a threshold distance from the pixel being replaced. In some implementations, the texture transfer block can perform texture synthesis to mitigate the generation of "seams".

For example, the image pyramid can then be utilized to determine shift data, which can be iteratively upsampled and updated. The processing can begin with the lowest resolution image in the image pyramid to generate initial shift data, which can then be upsampled and then utilized to determine updated shift data associated with a second lowest resolution image. The process can be repeated until shift data is determined for the input image resolution. In some implementations, upsampling the shift data can include scaling the shift data based on a change in resolution of the image being processed (e.g., the shift data may be multiplied by two in response to the image resolution of the newly processed image being two times that of the previously processed image. Additionally and/or alternatively, the shift data may be based in part on the output of the image augmentation model for all images in the image pyramid that have less and/or the same resolution as the output (e.g., the intermediate image) of the image augmentation model. The output of the image augmentation model can be the target for the optimization of the downsampled images. Determining the shift data can include selecting pixels adjacent to the occlusion pixels being replaced. In some implementations, the shift data can include data descriptive of pixels to be copied, such that the copied pixels are within a threshold proximity to the area being inpainted. The shift data can be further determined based on selecting pixels to copy such that the output matches the intermediate image generated by the image augmentation model. The shift vector values outside of the inpainting region can be zero.

In some implementations, shift data can include a set of vectors descriptive of the pixels in the image that are copied and placed in the occlusion region in order to replace the pixels associated with the one or more occlusions. The set of vectors can be integer vectors that begin at a source pixel and end at the location of the paste/replacement.

For example, the texture transfer block can process a first downsampled image in the image pyramid to generate a first output (e.g., an augmented first downsampled image in which one or more occlusion pixels are replaced with predicted source pixels). The first output can include first shift data. The first shift data can be descriptive of a set of first vectors associated with the copying and placing of pixels for replacing occlusion pixels.

Additionally and/or alternatively, the texture transfer block can generate upsampled first shift data based at least in part on the first shift data and a resolution difference between the first downsampled image and the second downsampled image. In some implementations, the first downsampled image can be of lower resolution than the second downsampled image.

In some implementations, the texture transfer block can process the upsampled first shift data and a second downsampled image in the image pyramid to generate a second output (e.g., an augmented second downsampled image in which one or more occlusion pixels are replaced with predicted source pixels). The second output can include second shift data. The second shift data can be determined based at least in part on the upsampled first shift data and the intermediate image.

The refined augmented image data can then be generated based at least in part on the input image and upsampled second shift data.

Figure 5:
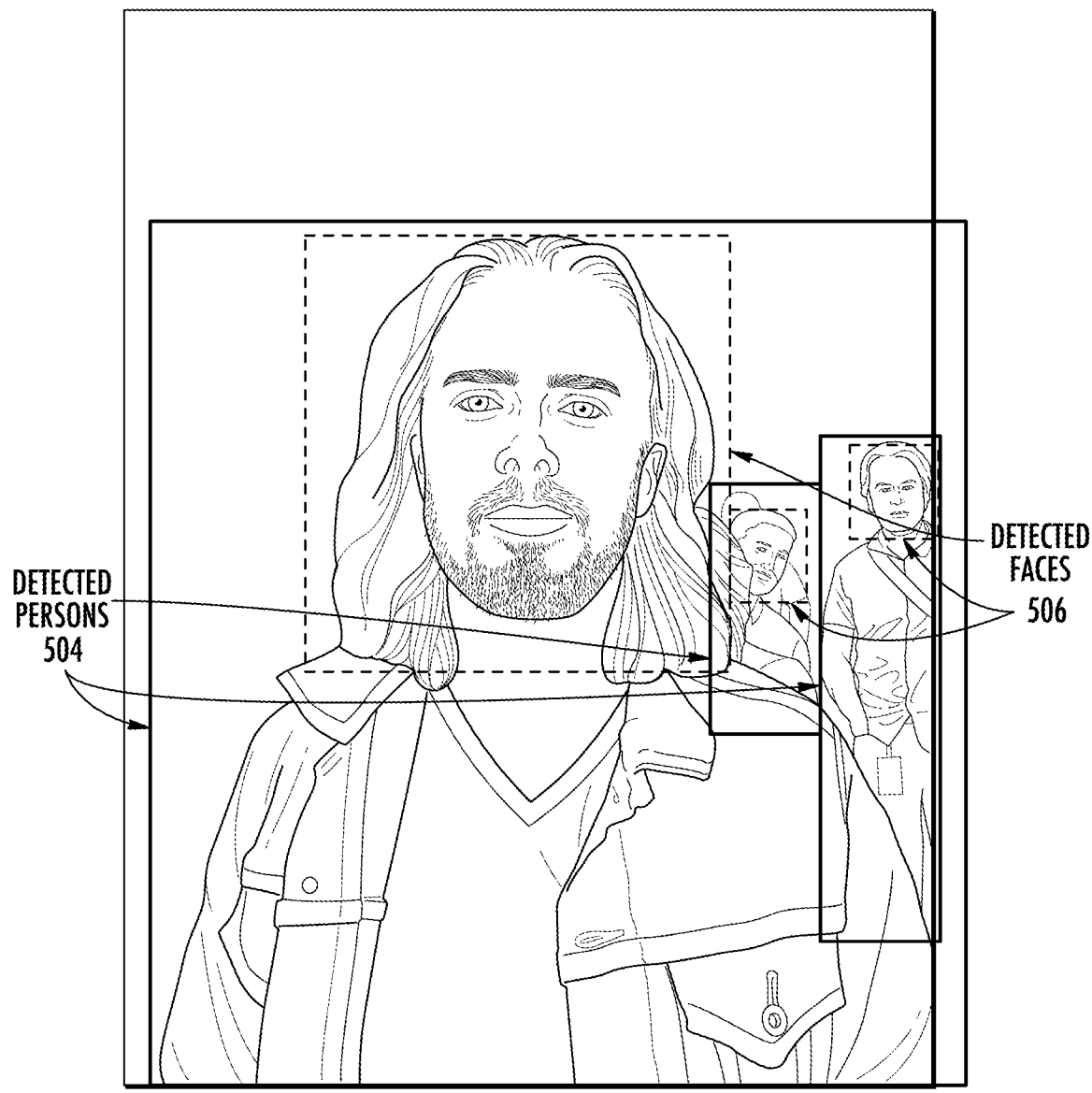
FIG. 5 depicts an illustration of example detection annotations according to example embodiments of the present disclosure.

FIG. 5 depicts an illustration of example detection annotations 500 according to example embodiments of the present disclosure. In particular, FIG. 5 can depict an input image 502. FIG. 5 can further include one or more detected persons annotations 504 and one or more detected faces annotations 506. The detected persons annotations 504 and the detected faces annotations 506 can be generated by processing the input image 502 with one or more detection models to generate one or more bounding boxes. The one or more bounding boxes can then be utilized to generate the annotations which can be selectable by a user to determine which objects to keep or replace in the input image 502. Additionally and/or alternatively, the annotations may be generated based in part on bystander scores generated by a bystander model.

Example Methods

Figure 6:
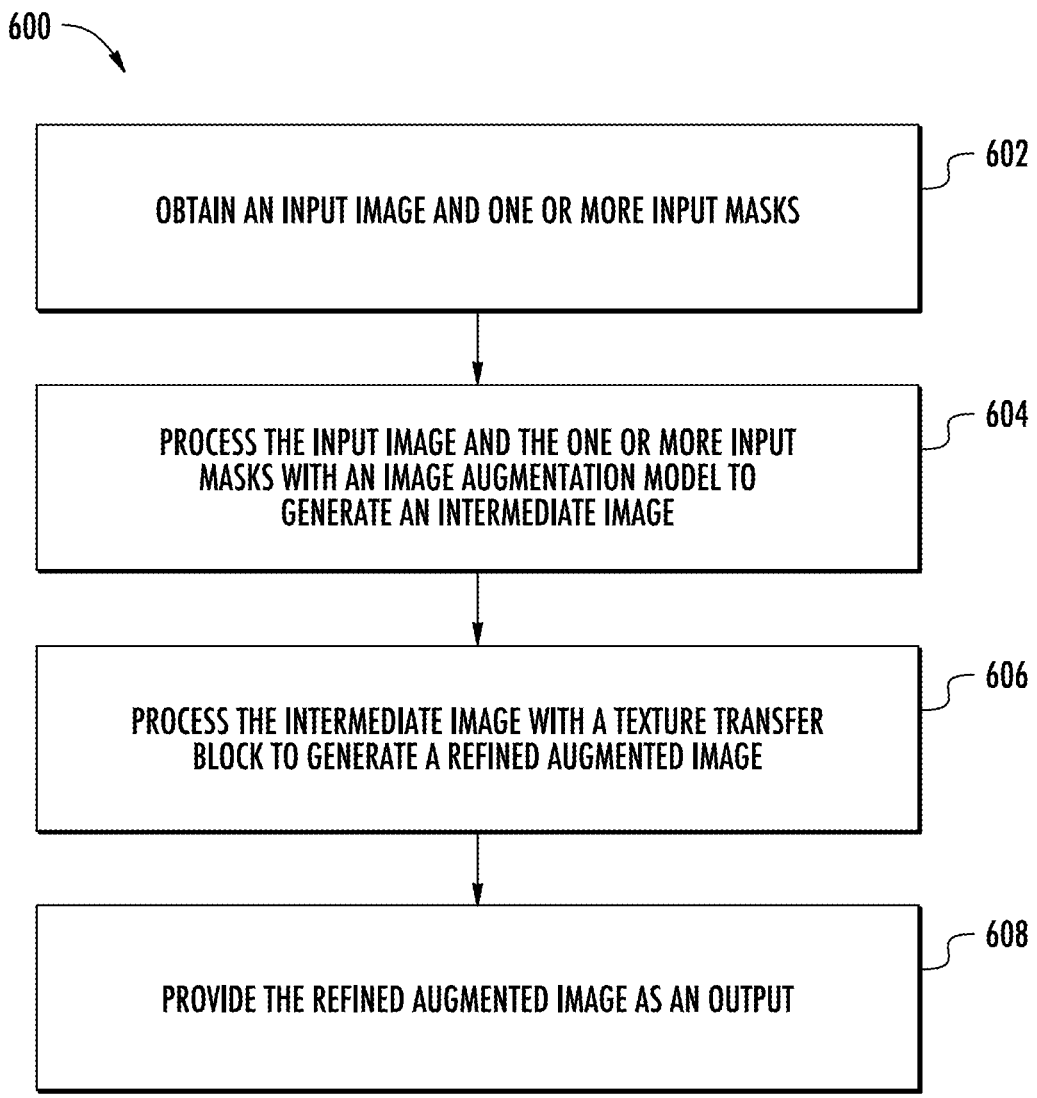
FIG. 6 depicts a flow chart diagram of an example method to perform image augmentation according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain an input image and one or more input masks. The input image can be descriptive of one or more objects (e.g., one or more occlusions, which can include people, animals, light poles, cars, trash, etc.) in a scene (e.g., the area around a monument, a tourist attraction, etc.). The one or more input masks can identify masked pixels that correspond to the one or more objects. In some implementations, the one or more input masks can include a subject mask and one or more occlusion masks. The subject mask can be associated with a foreground object in the scene. In some implementations, the one or more occlusion masks can be associated with one or more occlusions in the input image. In some implementations, the one or more input masks can include a bystander mask and a main subject mask. The main subject mask can be subtracted from the bystander mask to generate a distractor mask for processing.

At 604, the computing system can process the input image and the one or more input masks with an image augmentation model to generate an intermediate image. The intermediate image can depict the input image (e.g., the scene with the one or more objects replaced by predicted pixels) with the one or more occlusions replaced by predicted pixels. For example, the intermediate image can depict the scene with the masked pixels replaced by the predicted pixels. In some implementations, the image augmentation model can include an augmentation model configured to augment the image at a 512×512 resolution.

At 606, the computing system can process the intermediate image with a texture transfer block to generate a refined augmented image. The texture transfer block can augment the masked pixels based at least in part on the intermediate image. In some implementations, the texture transfer block can be configured to determine one or more replacement pixels based on a proximity to one or more occlusion pixels. The one or more replacement pixels can be within a threshold proximity to the one or more occlusion pixels. Additionally and/or alternatively, the one or more occlusion pixels can be associated with the one or more objects. Processing the intermediate image and the one or more input masks with the texture transfer block to generate the refined output data can include generating a plurality of downsized output data. Replacement data for replacing the predicted data can be determined based at least in part on the plurality of downsized output data. In some implementations, the texture transfer block can include a plurality of upsample shifts. Processing the input image, the intermediate image, and the one or more input masks can include performing a texture transfer algorithm on masked pixels of the input image using the predicted pixels of the intermediate image as a target. Alternatively and/or additionally, processing the input image and the intermediate image with the texture transfer block to generate the refined augmented image can include generating an image pyramid based on the input image and the one or more input masks. The image pyramid can include the input image and a plurality of downsampled versions of the input image. Generating the image pyramid can include processing the input image and the one or more input masks to generate a downsampled image (e.g., the second downsampled image). The downsampled image can be generated by weighting pixels of the input image to reduce the resolution by half. For example, every other pixel may be weighted to downsize the image by half. In some implementations, the pixels associated with masked regions may be given a weight of zero. The masked regions can be pixels covered by an occlusions segmentation mask. The downsampled image can then be processed to generate a downsampled version (e.g., first downsampled image) of the downsampled image. The process can be repeated iteratively (e.g., until a lowest resolution image is generated (e.g., a 5×5 image)).

The image pyramid can then be utilized to determine shift data, which can be iteratively upsampled and updated. The processing can begin with the lowest resolution image in the image pyramid to generate an initial shift data, which can then be upsampled and then utilized to determine updated shift data associated with a second lowest resolution image. The process can be repeated until shift data is determined for the input image resolution. In some implementations, upsampling the shift data can include scaling the shift data based on a change in resolution of the image being processed (e.g., the shift data may be multiplied by two in response to the image resolution of the newly processed image being two times that of the previously processed image. Additionally and/or alternatively, the shift data may be based in part on the output of the image augmentation model for all images in the image pyramid that have less and/or the same resolution as the output (e.g., the intermediate image) of the image augmentation model. The output of the image augmentation model can be the target for the optimization of the downsampled images. Determining the shift data can include selecting pixels adjacent to the occlusion pixels being replaced. In some implementations, the shift data can include data descriptive of pixels to be copied, such that the copied pixels are within a threshold proximity to the area being inpainted. The shift data can be further determined based on selecting pixels to copy such that the output matches the intermediate image generated by the image augmentation model. The shift vector values outside of the inpainting region can be zero.

In some implementations, shift data can include a set of vectors descriptive of the pixels in the image that are copied and placed in the occlusion region in order to replace the pixels associated with the one or more occlusions. The set of vectors can be integer vectors that begin at a source pixel and end at the location of the paste/replacement.

For example, the texture transfer block can process a first downsampled image in the image pyramid to generate a first output (e.g., an augmented first downsampled image in which one or more occlusion pixels are replaced with predicted source pixels). The first output can include first shift data. The first shift data can be descriptive of a set of first vectors associated with the copying and placing of pixels for replacing occlusion pixels.

Additionally and/or alternatively, the texture transfer block can generate upsampled first shift data based at least in part on the first shift data and a resolution difference between the first downsampled image and the second downsampled image. In some implementations, the first downsampled image can be of lower resolution than the second downsampled image.

In some implementations, the texture transfer block can process the upsampled first shift data and a second downsampled image in the image pyramid to generate a second output (e.g., an augmented second downsampled image in which one or more occlusion pixels are replaced with predicted source pixels). The second output can include second shift data. The second shift data can be determined based at least in part on the upsampled first shift data and the intermediate image.

The refined augmented image data can then be generated based at least in part on the input image and upsampled second shift data.

The texture transfer block can include a color shift block. The color shift block can be configured to synthesize the color of the inpainted area (e.g., the area in which pixels are being replaced) to provide smoothness. The color shift block can mitigate and/or eliminate smoothness cost. In some implementations, the color shift block can generate a high contrast output, which can be processed to determine artifacts in the scene that need to be further adjusted due to lingering color irregularities.

Additionally and/or alternatively, processing the output data with the texture transfer block to generate the refined augmented image can include generating a lower resolution version of the output data. The computing system can include determining a first pixel in the output data to replace. The computing system can determine a second pixel in the lower resolution version that is associated with the first pixel in the output data. In some implementations, the computing system can include determining one or more third pixels are adjacent to the second pixels. The refined augmented image can be generated based at least in part on the one or more third pixels. For example, the texture transfer block can be configured to construct an image pyramid of the input image at different resolutions and/or different sizes. The texture transfer block can then utilize the image pyramid to determine the replacement pixels. The process can involve starting with the lowest resolution and/or the lowest size and then optimizing. Once optimized, the texture transfer block can include an upsample shift to the next image version. In some implementations, the previous level of processing can be utilized to initialize shifts.

Additionally and/or alternatively, the texture transfer block can leverage the one or more input masks for data prediction. For example, the texture transfer block can replace data in the distractor mask and can avoid replacing data from the subject mask.

In some implementations, the output data may be cropped before being processed by the texture transfer block. The output data can be cropped into a patch at a fixed size. Alternatively and/or additionally, the output data can be cropped into one or more patches based on the size of the occlusions. In some implementations, a patch may be generated for each occlusion in the input data. Alternatively and/or additionally, if one or more occlusions (e.g., distractors) are in a same region, a singular patch may be generated.

At 608, the computing system can provide the refined augmented image as an output. The refined augmented image can be provided for display via a user interface. The user interface can be provided as part of a photo gallery application, an image augmentation application, and/or a web application.

Figure 7:
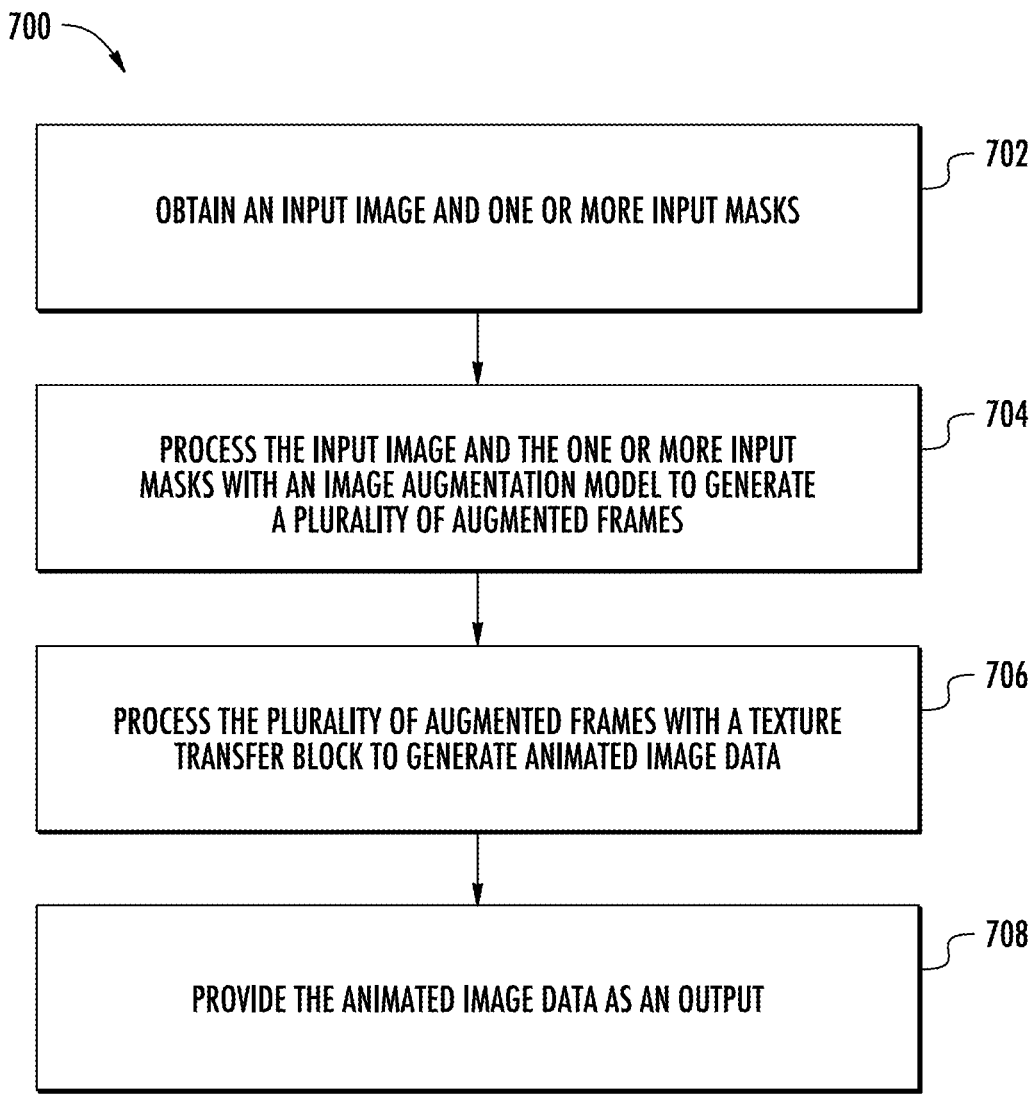
FIG. 7 depicts a flow chart diagram of an example method to perform animated image generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain an input image and one or more input masks. The input image can be descriptive of a foreground subject in a scene. In some implementations, the foreground subject can include at least a portion of a person.

At 704, the computing system can process the input image and the one or more input masks with an image augmentation model to generate a plurality of augmented frames. Each frame of the plurality of augmented frames can be descriptive of the foreground subject with a second perspective of the scene.

At 706, the computing system can process the plurality of augmented frames with a texture transfer block to generate animated image data. The texture transfer block can augment one or more pixels of each frame of the plurality of augmented frames based on surrounding pixels in the respective frame. In some implementations, the animated image data can include at least one of graphics interchange format data or video data.

At 708, the computing system can provide the animated image data as an output. The animated image data can be provided in a photo gallery application, an animated image application, or in any other application or interface.

Figure 8:
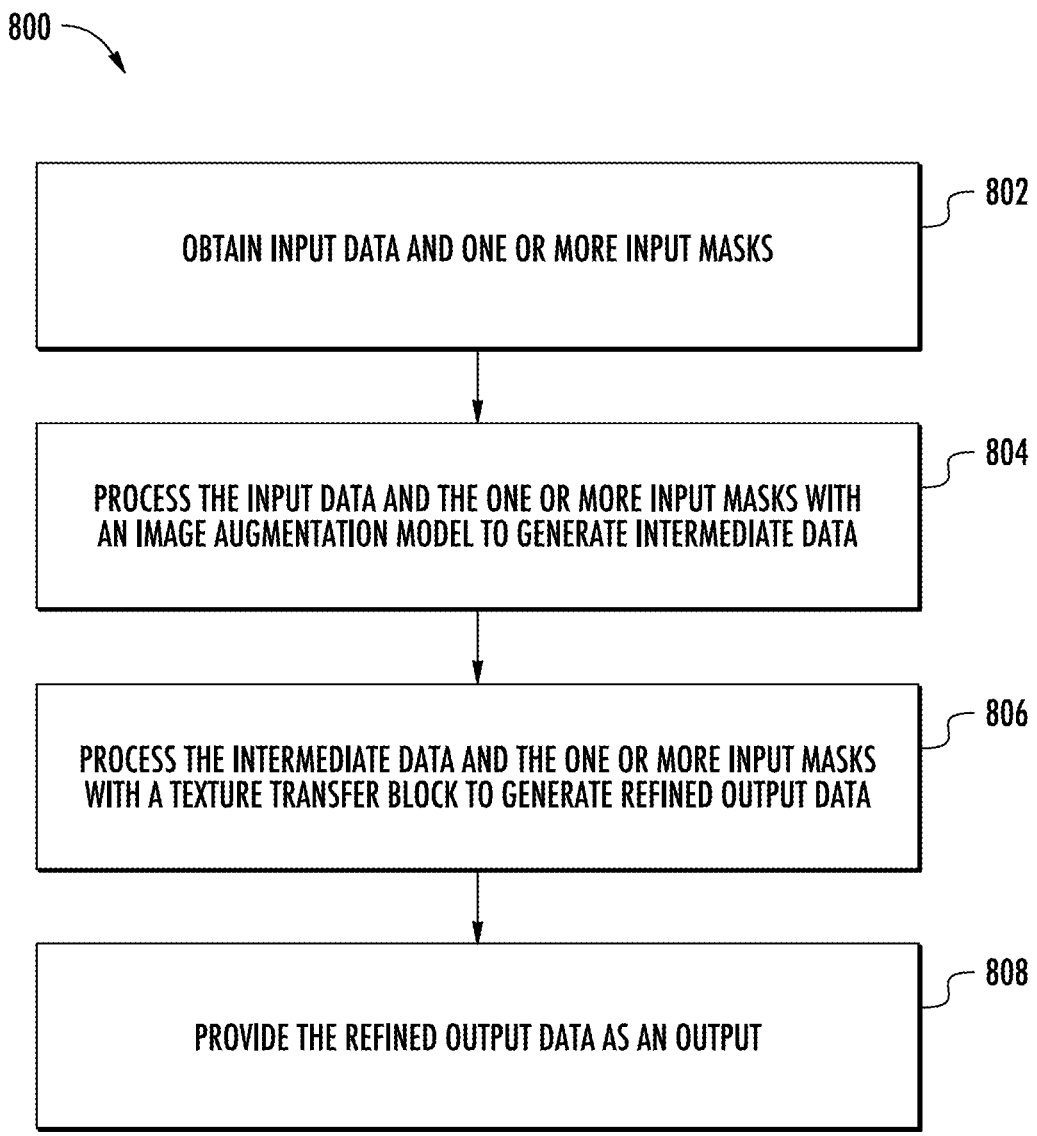
FIG. 8 depicts a flow chart diagram of an example method to perform image augmentation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain input data and one or more input masks. The input data can be descriptive of data with one or more occlusions. Additionally and/or alternatively, the one or more input masks can be associated with the one or more occlusions. In some implementations, the one or more input masks can be obtained in response to one or more user inputs. For example, a user can select (e.g., a user can draw a circle around an object they wish to remove via one or more user interface features) an object and/or a portion of the input data to replace with predicted data (e.g., predicted pixels). In some implementations, the input data can be processed with a detection model and/or a segmentation model to generate one or more annotations for the input data. The user may select one or more of the annotations, which can then be utilized to obtain and/or generate the one or more input masks. In some implementations, the one or more input masks can identify masked data associated with the one or more occlusions.

At 804, the computing system can process the input data and the one or more input masks with an image augmentation model to generate intermediate data. The intermediate data can be descriptive of the input data (e.g., the scene with the one or more objects replaced by predicted pixels) with masked data (e.g., masked data associated with the one or more occlusions) replaced by predicted data. In some implementations, the image augmentation model can include an augmentation model configured to augment the image at a 512×512 resolution.

At 806, the computing system can process the intermediate data and the one or more input masks with a texture transfer block to generate refined output data. The texture transfer block can augment the masked data based on surrounding data in the input data and/or the intermediate data. The texture transfer block can transfer high resolution pixels to the one or more occlusion areas. The texture transfer block can be a non-machine-learning block and may be of low computational cost. In some implementations, the texture transfer block can be utilized to determine a set of data (e.g., a set of pixels) from the input data to be copied and utilized to replace data (e.g., pixels) associated with the one or more occlusions.

In some implementations, the texture transfer block can generate a plurality of downsampled versions of the input data. The texture transfer block can then determine shift data (e.g., a set of integer vectors) for each of the plurality of downsampled versions of the input data. The shift data can be descriptive of source data in the input data utilized for replacing occlusion data. In some implementations, respective shift data for at least one or more of the plurality of downsampled versions can be based at least in part on the intermediate data. The plurality of downsampled versions can be part of an image pyramid and may be descriptive of lower resolution versions of the input data with the one or more occlusions masked. Additionally and/or alternatively, the texture transfer block can include a plurality of upsample shifts, which can include scaling the shift data based at least in part on a resolution difference between downsampled versions.

At 808, the computing system can provide the refined output data as an output. The refined output data can be provided via a user interface. The refined output data can be stored to a memory of a user computing device.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for image augmentation, the system comprising:
one or more processors; and
one or more non-transitory computer-readable media that collectively store instructions that, when executed by the one or more processors, cause the computing system to perform operations, the operations comprising:
obtaining an input image and one or more input masks, wherein the input image depicts one or more objects in a scene, and wherein the one or more input masks identify masked pixels that correspond to the one or more objects;
processing the input image and the one or more input masks with an image augmentation model to generate an intermediate image, wherein the intermediate image depicts the scene with the masked pixels replaced by predicted pixels;
processing the input image and the intermediate image with a texture transfer block to generate a refined augmented image, wherein the texture transfer block augments the masked pixels based on surrounding pixels in the intermediate image, wherein the texture transfer block is configured to determine one or more replacement pixels based on a proximity to one or more occlusion pixels, wherein the one or more replacement pixels are based on pixels within the proximity to the one or more occlusion pixels, and wherein the one or more occlusion pixels are associated with the one or more objects; and
providing the refined augmented image as an output.

2. The system of claim 1, wherein processing the input image and the intermediate image with the texture transfer block to generate the refined augmented image comprises:
generating an image pyramid based on the input image and the one or more input masks, wherein the image pyramid comprises the input image and a plurality of downsampled versions of the input image;
processing a first downsampled image in the image pyramid to generate a first output, wherein the first output comprises first shift data, wherein the first shift data is descriptive a set of first vectors associated with the copying and placing of pixels for replacing occlusion pixels;
generating upsampled first shift data based at least in part on the first shift data and a resolution difference between the first downsampled image and a second downsampled image, wherein the first downsampled image is of lower resolution than the second downsampled image;
processing the upsampled first shift data and the second downsampled image in the image pyramid to generate a second output, wherein the second output comprises second shift data, wherein the second shift data is determined based at least in part on the upsampled first shift data and the intermediate image; and
generating the refined augmented image based at least in part on the input image and upsampled second shift data.

3. The system of claim 2, wherein generating the image pyramid comprises:
processing the input image and the one or more input masks to generate the second downsampled image, wherein the second downsampled image is generated by weighting pixels of the input image to reduce the resolution by half; and
processing the second downsampled image to generate the first downsampled image.

4. The system of claim 1, wherein obtaining the input image and the one or more input masks comprises:
obtaining the input image;
processing the input image with an image segmentation model to generate the one or more segmentation masks associated with the one or more objects in the scene;
providing input image for display with one or more annotations, wherein the one or more annotations are associated with the one or more segmentations masks;
receiving one or more selections associated with the one or more annotations; and
determining the one or more input masks based on the one or more selections.

5. The system of claim 4, wherein the one or more annotations comprise one or more highlighted portions of the scene, wherein the one or more highlighted portions are associated with the one or more objects.

6. The system of claim 1, wherein processing the input image and the intermediate image with a texture transfer block comprises performing a texture transfer algorithm on masked pixels of the input image using the predicted pixels of the intermediate image as a target.

7. The system of claim 1, wherein the one or more input masks comprise a subject mask and one or more occlusion masks, wherein the subject mask is associated with a foreground object in the scene, and wherein the one or more occlusion masks are associated with one or more occlusions in the input image.

8. The system of claim 1, wherein processing the input image and the intermediate image with the texture transfer block to generate the refined augmented image comprises:
generating a lower resolution version of the intermediate image;
determining a first pixel in the intermediate image to replace;
determining a second pixel in the lower resolution version that is associated with the first pixel in the intermediate image;
determine one or more third pixels are adjacent to the second pixels; and
generating the refined augmented image based at least in part on the one or more third pixels.

9. The system of claim 1, wherein the operations are executed by a mobile computing device.

10. A computer-implemented method for image augmentation, the method comprising:
obtaining, by a computing system comprising one or more processors, obtaining an input image and one or more input masks, wherein the input image depicts one or more objects in a scene, and wherein the one or more input masks identify masked pixels that correspond to the one or more objects;
processing, by the computing system, the input image and the one or more input masks with an image augmentation model to generate an intermediate image, wherein the intermediate image depicts the scene with the masked pixels replaced by predicted pixels;
processing, by the computing system, the input image and the intermediate image with a texture transfer block to generate a refined augmented image, wherein the texture transfer block augments the masked pixels based on surrounding pixels in the intermediate image, wherein the texture transfer block is configured to determine one or more replacement pixels based on a proximity to one or more occlusion pixels, wherein the one or more replacement pixels are based on pixels within the proximity to the one or more occlusion pixels, and wherein the one or more occlusion pixels are associated with the one or more objects; and providing, by the computing system, the refined augmented image as an output.

11. The method of claim 10, further comprising:

obtaining, by the computing system, the input image;

processing, by the computing system, the input image with a detection model to generate detection data, wherein detection data comprises data descriptive of one or more locations for the one or more objects; and generating, by the computing system, the one or more input masks based on the detection data.

12. The method of claim 11, wherein the detection data comprises a plurality of bounding boxes associated with a plurality of objects, wherein the detection data comprises a respective confidence score for each of the plurality of bounding boxes.

13. The method of claim 10, wherein the one or more input masks are generated with a segmentation model.

14. The method of claim 10, wherein the upsampled second shift data comprises a set of integer vectors.

15. One or more non-transitory computer-readable media that collectively store instructions that, when executed by one or more computing devices, cause the one or more computing devices to perform operations, the operations comprising:

obtaining an input image and one or more input masks, wherein the input image depicts one or more objects in a scene, and wherein the one or more input masks identify masked pixels that correspond to the one or more objects;

processing the input image and the one or more input masks with an image augmentation model to generate an intermediate image, wherein the intermediate image depicts the scene with the masked pixels replaced by predicted pixels;

processing the input image and the intermediate image with a texture transfer block to generate a refined augmented image, wherein the texture transfer block augments the masked pixels based on surrounding pixels in the intermediate image, wherein the texture transfer block is configured to determine one or more replacement pixels based on a proximity to one or more occlusion pixels, wherein the one or more replacement pixels are based on pixels within the proximity to the one or more occlusion pixels, and wherein the one or more occlusion pixels are associated with the one or more objects; and providing the refined augmented image as an output.

16. The one or more non-transitory computer-readable media of claim 15, wherein the input image comprises a foreground subject in the scene.

17. The one or more non-transitory computer-readable media of claim 16, wherein the foreground subject comprises at least a portion of a person.

18. The one or more non-transitory computer-readable media of claim 15, wherein the texture transfer block comprises a color shift block.

19. The one or more non-transitory computer-readable media of claim 18, wherein the color shift block is configured to generate a high contrast output.

20. The one or more non-transitory computer-readable media of claim 15, wherein the operations are executed by a wearable computing device.

* * * * *